(12) United States Patent
Diels

(10) Patent No.: US 9,685,065 B2
(45) Date of Patent: Jun. 20, 2017

(54) DUAL SENSOR SYSTEM AND RELATED DATA MANIPULATION METHODS AND USES

(71) Applicant: Sensolid BVBA, Diest (BE)

(72) Inventor: Roger Diels, Oud-Heverlee (BE)

(73) Assignee: SENSOLID BVBA, Diest (BE)

( * ) Notice: Subject to any disclaimer, the term of this patent is extended or adjusted under 35 U.S.C. 154(b) by 0 days.

(21) Appl. No.: 14/759,221

(22) PCT Filed: Jan. 2, 2014

(86) PCT No.: PCT/EP2014/050004
§ 371 (c)(1),
(2) Date: Jul. 3, 2015

(87) PCT Pub. No.: WO2014/106626
PCT Pub. Date: Jul. 10, 2014

(65) Prior Publication Data
US 2015/0379851 A1    Dec. 31, 2015

Related U.S. Application Data

(60) Provisional application No. 61/748,536, filed on Jan. 3, 2013.

(30) Foreign Application Priority Data

Jan. 3, 2013   (EP) .................................... 13150169

(51) Int. Cl.
*G06F 17/00*   (2006.01)
*G06T 1/00*    (2006.01)
(Continued)

(52) U.S. Cl.
CPC ....... *G08B 21/043* (2013.01); *G08B 21/0492* (2013.01); *G08B 29/188* (2013.01)

(58) Field of Classification Search
CPC . G08B 21/043; G08B 29/188; G08B 21/0492
See application file for complete search history.

(56) References Cited

U.S. PATENT DOCUMENTS 6,791,450 B2 *   9/2004   Gokcebay .............. G06Q 40/04
                                              235/375
8,489,232 B2 *   7/2013   Mishra .................. G06Q 10/08
                                              235/384

(Continued)

FOREIGN PATENT DOCUMENTS

KR   10-2012-0091970      8/2012
WO   WO 2014/106626 A1    7/2014

OTHER PUBLICATIONS

Chen, et al., "Fusion of Infrared and Range Data: Multi-modal Face Images", *Advances in Biometrics Lecture Notes in Computer Science*, pp. 55-63 (2005).

(Continued)

*Primary Examiner* — Erin File
(74) *Attorney, Agent, or Firm* — Hoxie & Associates LLC

(57) ABSTRACT

The invention relates to sensor systems and related data manipulation methods and software and use thereof, for instance amongst others, in surveillance systems, e.g. fall detection, more in particular systems and methods for capturing data of a scene is provided, comprising a first sensor, providing a first data set; a second sensor, spatially arranged with respect to the first sensor in a predetermined arrangement, the second sensor providing a second data set; and data manipulation means using said first and/or second data set to support enhanced data computations on one or both of said data sets to generate said scene data.

14 Claims, 21 Drawing Sheets

(51) Int. Cl.
*G08B 21/04* (2006.01)
*G08B 29/18* (2006.01)

(56) References Cited

U.S. PATENT DOCUMENTS

| | | | |
|---|---|---|---|
| 8,639,384 B2* | 1/2014 | Young | G06Q 10/08 235/384 |
| 9,176,608 B1* | 11/2015 | Baldwin | G09G 5/00 |
| 2003/0102688 A1* | 6/2003 | Bingle | B60Q 3/06 296/76 |
| 2006/0139314 A1 | 6/2006 | Bell | |
| 2007/0086624 A1* | 4/2007 | Breed | G06K 9/00362 382/104 |
| 2012/0154557 A1* | 6/2012 | Perez | H04N 21/25891 348/53 |
| 2012/0326840 A1* | 12/2012 | Frankenberg | G07F 17/12 340/5.65 |
| 2012/0327218 A1 | 12/2012 | Baker et al. | |
| 2013/0007668 A1* | 1/2013 | Liu | G06F 3/012 715/841 |
| 2014/0258168 A1* | 9/2014 | Crawford | G06Q 10/0836 705/339 |

OTHER PUBLICATIONS

Ros, et al., "A Generative Model for 3D Range Sensors in the Bayesian Occupancy Filter Framework: Application for Fusion in Smart Home Monitoring", 13$^{th}$ *Conference on Information Fusion, IEEE*, pp. 1-8 (2010).

Saba, et al., "Dante Vision: In-air and Touch Gesture Sensing for Natural Surface Interaction with Combined Depth and Thermal Cameras", *Emerging Signal Processing Applications (ESPA), IEEE*, pp. 167-170 (2012).

Van Baar, et al., "Sensor Fusion for Depth Estimation, Including TOF and Thermal Sensors", *2012 Second Joint 3DIM/3DPVT Conference: 3D Imaging, Modeling, Processing, Visualization & Transmission*, pp. 472-478 (2012).

International Search Report and Written Opinion, International Application No. PCT/EP2014/050004, prepared by the International Search Authority, date mailed: Apr. 24, 2014, 12 pages.

\* cited by examiner

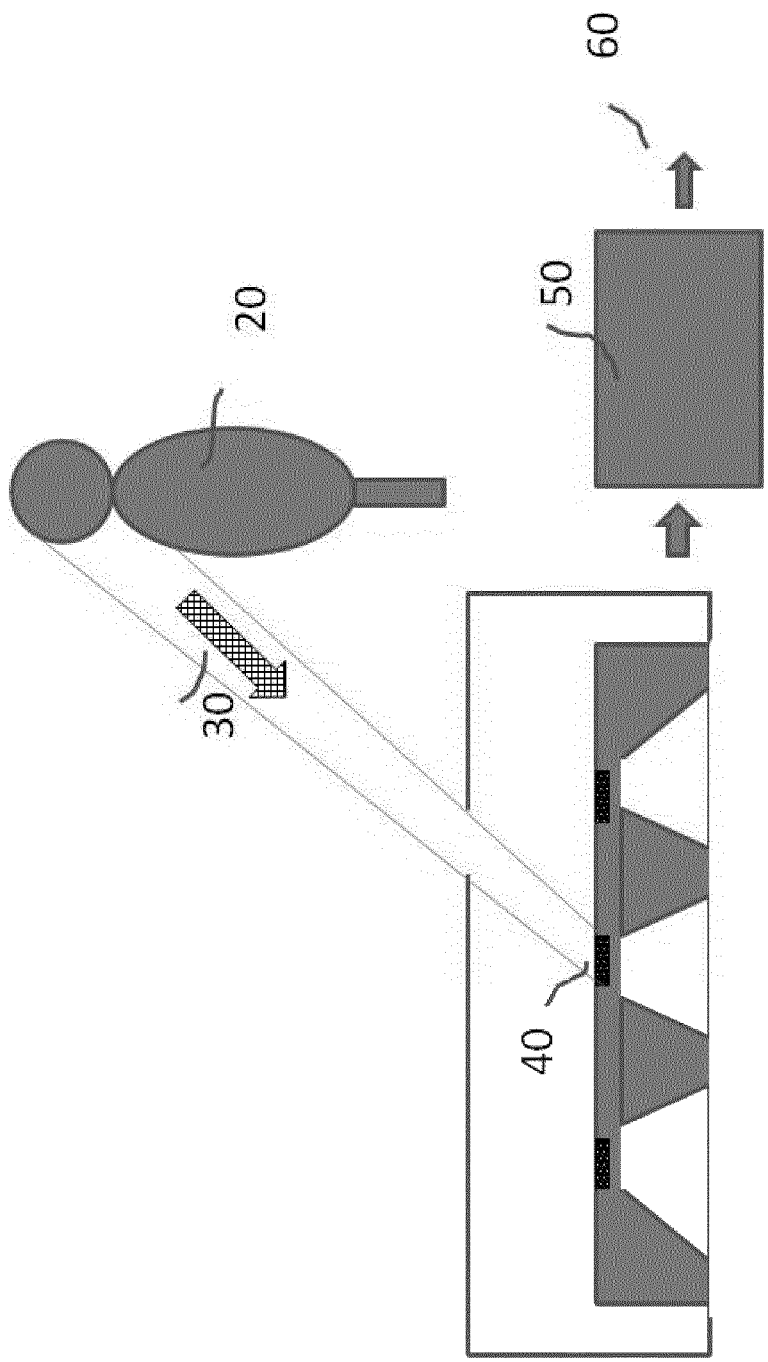

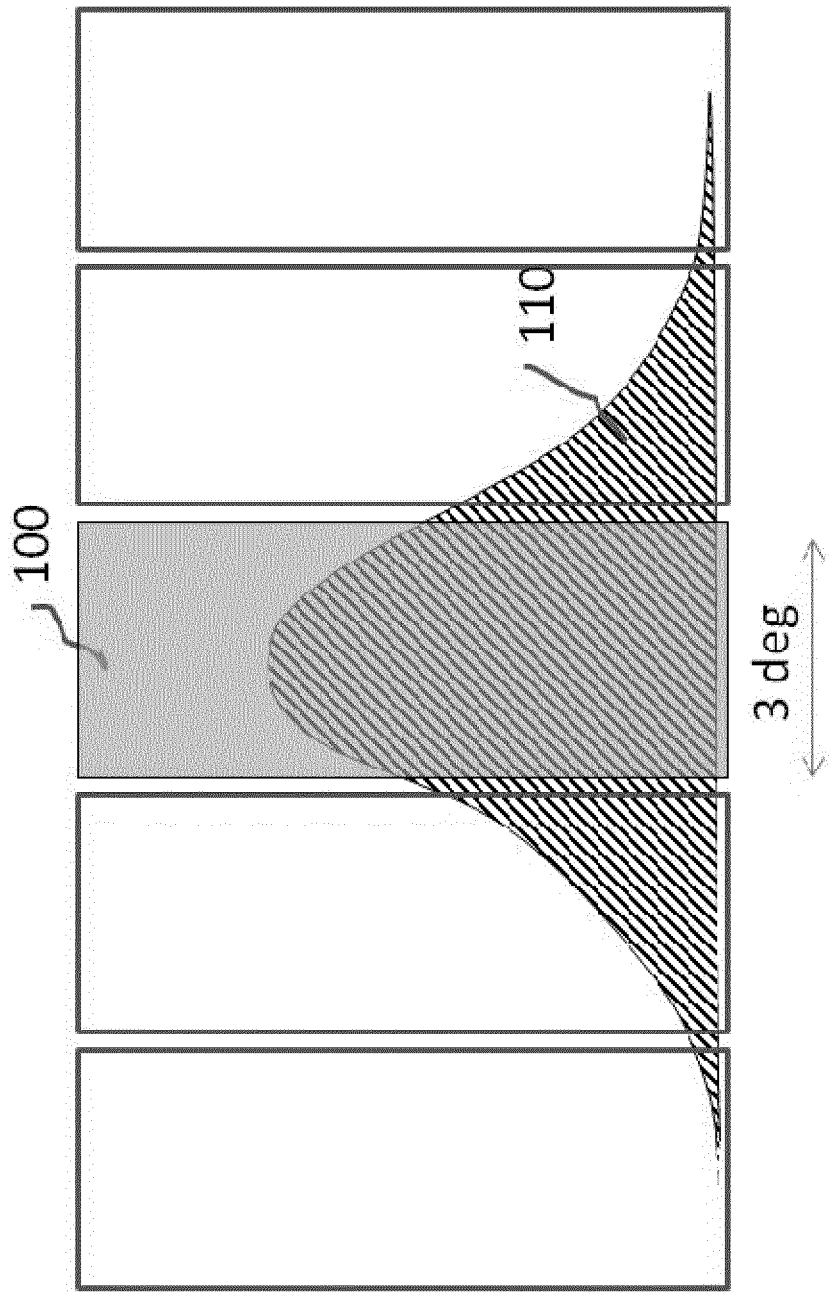

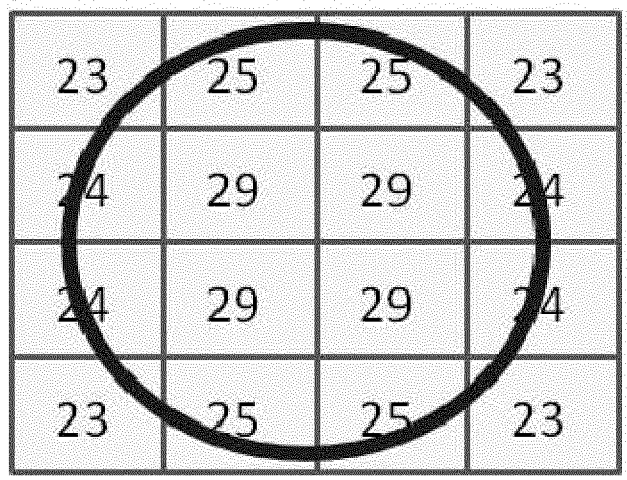
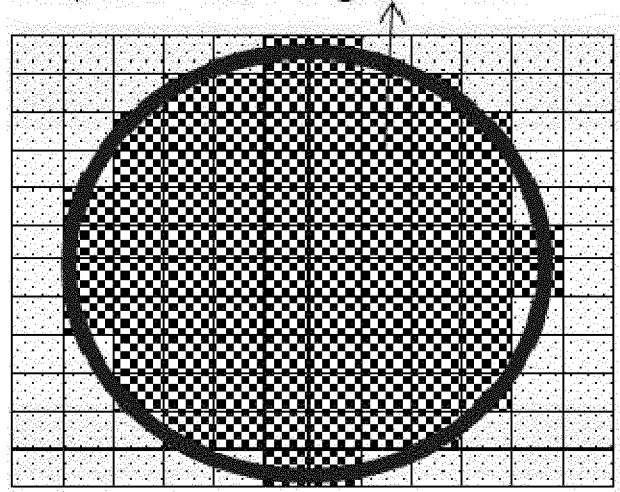
Fig 9A

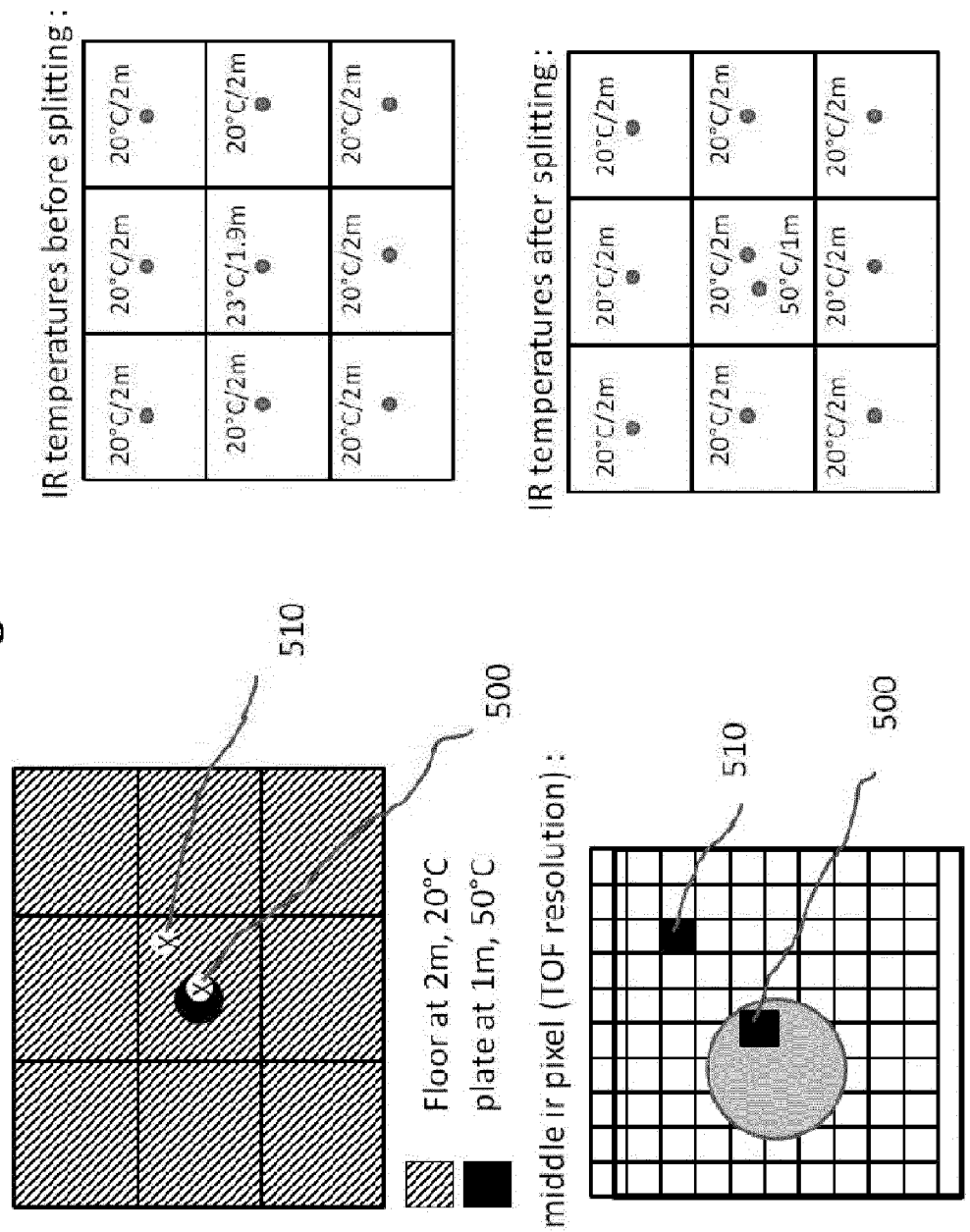

DUAL SENSOR SYSTEM AND RELATED DATA MANIPULATION METHODS AND USES

CROSS REFERENCE TO RELATED APPLICATIONS

This application is a national stage application under 35 U.S.C. §371 of PCT/EP2014/050004, filed on Jan. 2, 2014, which claims the benefit of EP13150169.4 filed on Jan. 3, 2013, and U.S. Provisional Application 61/748,536 filed on Jan. 3, 2013, the contents of each of which are incorporated herein by reference.

FIELD OF THE INVENTION

The invention relates to sensor systems and related data manipulation methods and software and use thereof, for instance amongst others, in surveillance systems, e.g. fall detection, or other uses in industry.

BACKGROUND OF THE INVENTION

Many (mostly elderly) people accidently fall, when staying alone in their house/flat/room, and can't recover on their own. This can leave them helpless for hours, sometimes even days. It can have severe consequences, and can even result in the death of the person One has tried for a very long time to find a solution, where a system would automatically detect such a fall, and would activate a warning.

The most used system today is a device with a help button: when the person falls, and can't get up on its own, he/she can activate a button that will warn family/an emergency company or other. However, it has been shown that in real cases, in 4 out of 5 incidents, the person does/can't push this button (or unable to do so, or did not carry the device).

State of the art today is a system that one carries with them, and that contains some inertial sensors (acceleration and/or gyroscopes). This system will detect automatically a fall. If the person can't indicate after the fall that he/she is OK, it will again release a help request.

The big advantage is that it does not require an action of the person to activate the help call, but the person must wear the device. Also here, experiences shows that this is often not the case (one forgets to wear it when coming out of bed, after taking a shower, or one intentionally does not want to wear it since one does not want to be seen as aid-needed).

Also, since this system only detects the movement, and not the end position (is the person on the floor, or on a chair, . . . ) it often triggers falls alarms.

New investigations are now done on contactless systems, mostly based on normal visual cameras. Although that his solves the problem of the requirement to carry a device, these systems are not yet reliable enough. Another disadvantage is that a visual camera is perceived as a privacy intrusion. Trials are now done with dual visual cameras, so that one can calculate the distance to the person. But this is complicated and expensive.

Various groups are now working on using a Time of Flight camera, in order to have reliable distance data to distinguish objects. Even though it already gives more reliable results, the nr of falls alarms is still too high.

Another approach tried out is the use of PIR (pyro electrical passive infrared sensors). These are the type of sensors are also used for burglar alarms. Initially one used single devices, but nowadays there are also array sensors on the market. They detect movements of a warm object. But since these are AC sensors, they can't detect a warm object if it is standing still. Therefor one also has tried to combine this type of sensors with pressure sensors, in order to have more information about the position of the object.

Other attempts to use temperature as detection mean have used an temperature it sensor, to evaluate the situation, triggered by a pressure sensor, after the fall (design for fall detection system with floor pressure and infrared image). But the fall detection by pressure sensors is very limited. Also evaluating the final situation only by temperature is prone to errors. Another approach uses a temperature array to detect a fall from a toilet. Since it only relies on temperature, it is also very prone to the errors, since a very small temperature window is used to detect the position.

Till today, camera systems are not mature enough and therefore there are no fixed mounted systems on the fall detection market.

In the art sensor fusion, being the combining of sensory data or data derived from sensory data from disparate sources such that the resulting information is in some sense better than would be possible when these sources were used individually, wherein the term better in this case can mean more accurate, more complete, or more dependable, or refer to the result of an emerging view, is known but still does not provide sufficient performance.

Bringing data set of a different resolution to a same resolution by up- or down sampling one of the sets is known but does not alter performance.

Use in detection algorithms of multiple data sets of different nature in general is known (Julien Ros et al—A generative model for 3D sensors in the Bayesian Occupancy filter framework: Application for fusion in smart home monitoring, INFORMATION FUSION, 2012, $13^{th}$ Conference), in particular the use of a first detection algorithm on a first set and use the result thereof as input for a second algorithm operable on a second set, but such technique still does not provide sufficient performance, nor do they improve the data sets quality itself.

AIM OF THE INVENTION

The aim of the invention is to solve the above mentioned shortcomings of the state of the art technologies, in particular the fact that they are not not capable to extract the right conclusion on scene data, and for instance in case of a fall detection use case generate warnings when not needed (False Positive), and no warning in case of a real fall (False Negative). A further aim of the invention is to provide data capturing systems for industrial applications wherein enhanced temperature or depth data is required

SUMMARY OF THE INVENTION

The invention relates to systems, methods, computer program products and related storage media and uses as described in any of the claims appended hereto.

In a first aspect of the invention a system for capturing data of a scene is provided, comprising a first sensor, providing a first data set; a second sensor, spatially arranged with respect to the first sensor in a predetermined arrangement, the second sensor providing a second data set; and data manipulation means using said first and/or second data set to support enhanced data computations on one or both of said data sets to generate said scene data, more in particular said first and second sensors are based on different data capturing principles; and/or (typically as a consequence of such different principles) said first and second sensors have a different resolution. The invention exploits precisely this different nature of the sensors to enhance the information content in one or more of those data sets and preferably bring the data sets to a same or substantially the same resolution.

In a first embodiment of the invention said first sensor is a passive sensor, more preferably said first sensor is a temperature device, even more preferably an absolute temperature measuring or sensing device and/or a DC temperature measuring or sensing device (meaning capable to read a constant temperature). In an example thereof said first sensor is based on (an array of) a (IR) thermopiles. In an alternative embodiment said first sensor is based on (an array of) a bolometer. Also more complicated arrangement comprising both examples is possible.

In a second embodiment of the invention said second sensor is an active sensor, more preferably said second sensor is a distance device. As an example said second sensor is a (an array of) TOF device. The first and second embodiment of the invention can be combined.

In a further embodiment of the invention the data manipulation means uses said first and second data set in accordance with a pre-established spatial relationship of corresponding positions in the scene (be it directly or after correcting for the spatial arrangement of the both sensors with respect to each other), hence the means is able to link data in the memory of the data manipulation means based on the corresponding scene positions.

In a further embodiment of the invention the data manipulation means is able to distinguish a plurality of objects in the scene. The invention thereof enables an object based approach, of instance said adapting of part of said first data set can be based on recalculating part of said data set by assigning contributions in the first data set to objects, said assigning being based on said second data set (such as distinguishing whether an object is part of the foreground or background of a scene), more preferably said recalculating takes into account properties of objects. The invention therefore exploits all complementary information of both data sets where one data set relates to a feature of an object per se while the other data set relates to relative aspects of objects with respect to each other. This in combination with object characteristics allow to perform data manipulation based on the underlying physics in the scene or at least an approximate model thereof.

The 'enhanced data' computations are defined as to enhance the information content in at least one of those data sets by use of the other of said data sets, having a different nature. Note that adapting the resolution by classic up- or down sampling may be used in combination with the invention, which in itself however does not enhance the information content nor is it based on the other data set (except for knowledge of its resolution), nor is the different nature thereof exploited. Similarly sensor fusion can be used, but the invention goes beyond the mere combining of sensory data, as part of one of the data sets is actually changed by use of the other data set, to enhance this data. Therefore the data manipulation means uses at least one of said first and second data sets to support enhanced data or data enhancement computations on at least the other one of said data sets, as part of or to further generate said scene data, more in particular on pixel level. Therefore one adapts part of said first data set (itself) by use of said second data set (or otherwise). Otherwise stated the adapting of part of said first data set is based on recalculating part of said data set by assigning contributions in the first data set, said assigning being based on said second data set. In a data fusion no such recalculation by assigning contribution is performed based on another data set, at most copying of data in the up-sampling, to get to the same resolution, is performed, but no contribution assignment based on the other data set. Note that the data manipulation is based on the underlying physics in the scene or at least an approximate model thereof and therefore goes beyond combining and/or up- and down-sampling.

In a further embodiment said data manipulation means is able to detect movement of a plurality of objects by performing object tracking on the (adapted) first and/or second data set, more in particular said distinguishing of objects is based on said tracking. Hence the invention recognizes the need of historical data for reliable object recognition.

Finally in a further system embodiment the system provides support for fall detection as a use case, more in particular said data manipulation means is capable of detecting a fall of an object (e.g. a selected object as a warm object) in the scene based on the data of the scene, even more preferably said data manipulation means takes into account the final position of the object, to avoid false fall detection alarms.

In a second aspect of the invention methods for capturing data of a scene are provided, comprising inputting a first data set of a first sensor; inputting a second data set of a second sensor; and performing data manipulations using said first and second data set to support enhanced data computations on one or both of said data sets to generate said scene data. Note that the execution of said methods can be on any hardware either dedicated hardware or general purpose hardware (CPU, GPU) or combinations thereof. Further the delivery of the data from the sensors to the data manipulation hardware can be wired or wireless. The proposed methods support any of the data manipulation steps described before. Also the generated alarms in case of a fall detection can be generated locally (light, alarm signal) in the system and/or communicated to other surveillance systems in a wired or wireless fashion.

In an embodiment of this aspect of the invention the step of data manipulation adapts part of said first data set by use of said second data set.

In a further embodiment thereof the step of data manipulation uses said first and second data set in accordance with a pre-established spatial relationship of corresponding positions in the scene.

In yet a further embodiment the step of data manipulation performs the step of distinguishing a plurality of objects.

In further embodiments said adapting of part of said first data set is based on recalculating part of said data set by assigning contributions in the first data set to objects, said assigning being based on said second data set, preferably said recalculating takes into account properties of said objects.

In a further realization thereof said step of data manipulation performs a step of detecting of movement of a plurality of objects by performing object tracking in the (adapted) first and/or second data set.

In a more preferred implementation said distinguishing of objects is being based on said tracking.

Further a method is provided for detecting a fall of an object in a scene, comprising executing any of the methods discussed above; and determining a fall of an object in the scene based on the data of the scene, where preferably said determining takes into account the final position of the object.

In a further embodiment the above methods further comprise of data manipulations for performing data corrections taking into account the difference in angle of incidence of the scene data on the first and second sensor.

In a third aspect of the invention a computer program product is provided comprising code segments which when executed on a suitable processing engine implement those steps in any of the above discussed above.

In a fourth aspect of the invention a machine readable signal storage medium is provided, storing the computer program product, provided above.

In a fifth aspect of the invention a use is provided of any of the systems, methods, computer program products or machine readable signal storage medium described above for tracking of a living object and/or detecting the fall of a living object.

In a sixth aspect of the invention a further (calibration) method is provided of loading in the systems discussed before a predetermined spatial relationship of corresponding positions in the scene in the first and second data set.

In a seventh aspect of the invention a database of objects is provided, suitable for use with and accessible by computer program products as described before, comprising: a plurality of objects with at least the temperature of an object and its temperature dynamics properties as attributes; and rules for adapting said attribute related to temperature based on said temperature dynamics properties and distance information received via said computer program products.

BRIEF DESCRIPTION OF THE DRAWINGS

FIG. 3 illustrates the temperature sensing approach in accordance with the IR principle.

FIG. 4 provides a FOV detail of 1 IR pixel.

FIGS. 9A, 9B and 9C demonstrate an object tracking improvement in time example of a hand moving away from sensor.

FIG. 18 shows an example of bringing the temperature resolution towards TOF resolution in accordance with an embodiment of the invention.

DETAILED DESCRIPTION OF THE INVENTION

The invented systems and methods are based on distance and temperature measurements, optionally provided in an array format and, more in particular provide possibilities to extract scene information such as a fall of an object in such scene (without displaying the entire scene), and do this by intelligently combining (such as mapping) the related data sets, based on one or more of the following approaches: data linking based on scene position; applying (a model of) the physics in the scene such as applying (a model of) the physics of objects in the scene; using historical or temporal data (via object recognition and/or tracking and/or corrections in time based on object characteristics). In an embodiment of the invention intelligent combining of 2 technologies is provided, more in particular distance via Time-of-flight sensors and another scene property (for instance infrared thermopile sensors).

Figure 2:
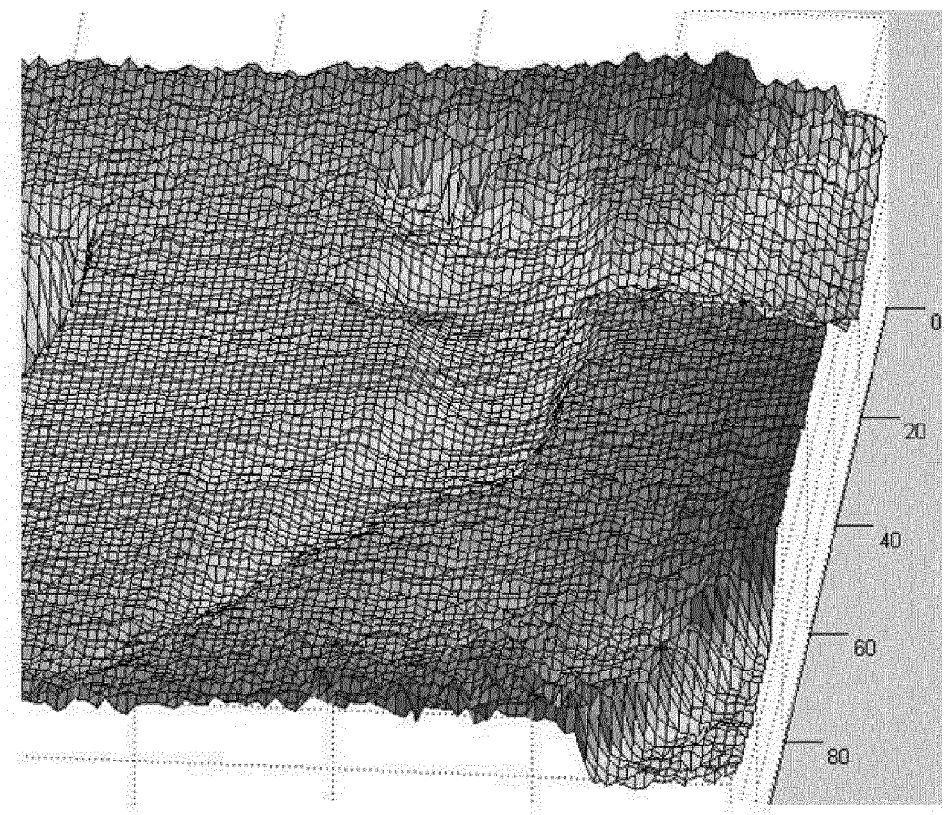
FIG. 2 shows an example of TOF sensor picture.

Time-of-flight is a technology where one sends out light, and measures the time that it takes for this light to bounce to an object, and return to the sensor. For every meter distance, it will take 6.6 nsec to return. With an array of these sensors, one can measure the distance in every direction within a field of view. A typical resolution nowadays is 140 pixels×160 pixels. Higher resolutions are now coming on the market. With this technology one can detect objects/persons, and see where they are and how they move. This distance information increases drastically the reliability, compared to normal visual cameras. In comparison to inertial sensors, it does not only detect movement, but also the final static situation (it can see that the person is indeed lying on the floor). Despite of the benefits of this type of sensor, it can't provide a fault proof detection. Other objects can move and fall on the ground (for instance a coat, or a chair that falls, . . . ). Also the object tracking itself is not flawless, since it is not always obvious to distinguish the different objects in a picture. FIG. 2 shows an example of TOF sensor picture.

This invention therefore combines the system with a temperature measurement, more in particular a passive DC infrared sensor array. This sensor can measure the absolute temperature of an object/or person at distance. Every object emits or absorbs energy to its environment as described in the Stefan-Boltzmann relationship: $P=e*\sigma*A*(To^4-Tc^4)$, where e=the emissivity factor, $\sigma=5.67E-8\ W/m^2K^4$, A=area of the object, To=temperature of the object and Tc=temperature of the surroundings.

Figure 5A:
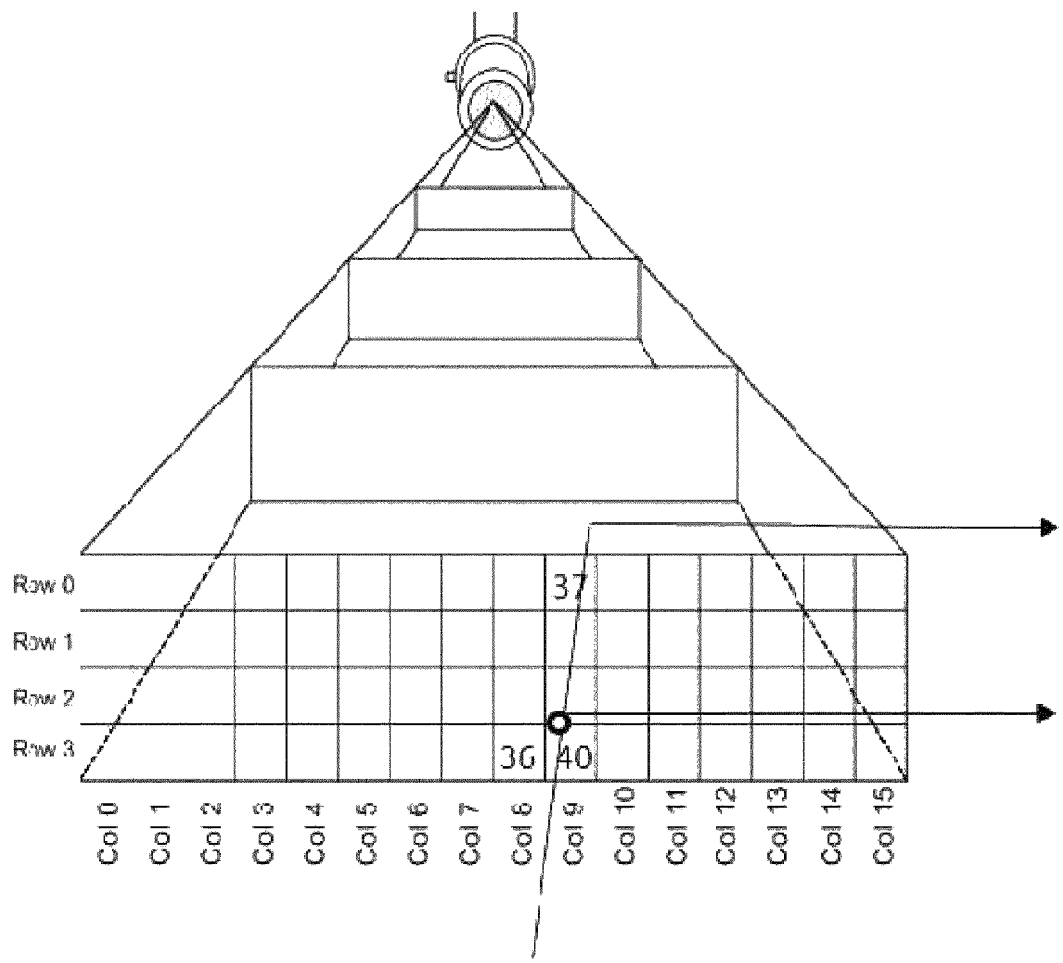
FIGS. 5A and 5B show a FOV example of IR sensor array and the pixel position in the whole FOV. The array consists of 64 IR sensors (also called pixels). Each pixel is identified with its row and column position as Pix(i,j) where i is its row number (from 0 to 3) and j is its column number (from 0 to 15).
Figure 5B:
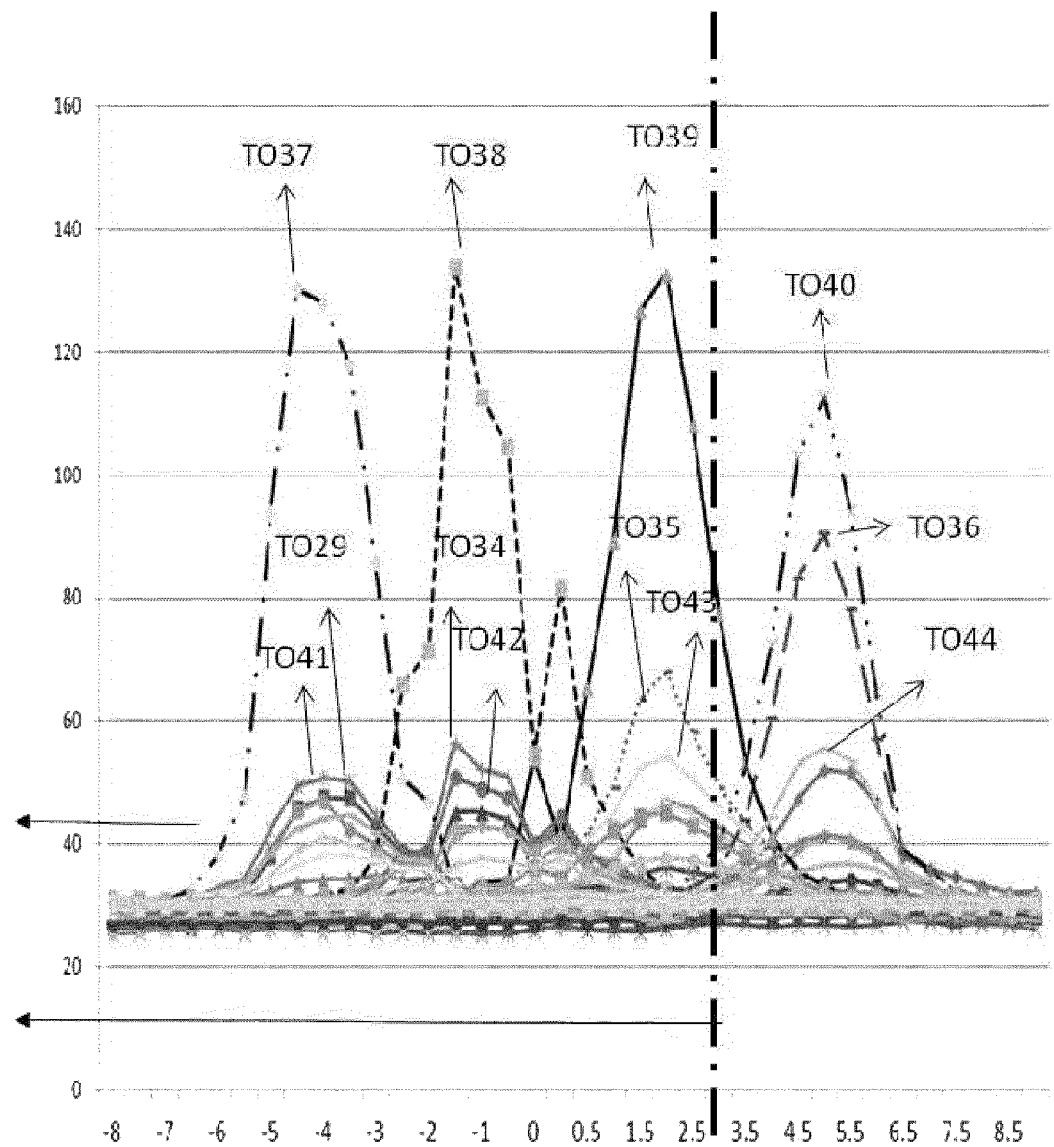

Simplified one can say that an object will radiate about 6 W/m2 per deg C. difference with its environment when the object can be considered as an it black body. Most body parts and clothing will be approaching an ideal black body. The sensor will collect a small portion of this energy (the portion of the emitted energy which falls on the sensor area). When using the thermopile sensor, then this energy will heat up a membrane (typically with a few mdeg C.), and a series of thermocouples will translate this temperature difference of the sensor membrane and the rest of the sensor device, into a voltage. A microprocessor (or equivalent) will then calculate the object temperature based on this voltage and the temperature of the sensor itself. It also can do this in every direction within a field of view. For a thermopile array the typical resolutions are smaller (for instance 16×16 pixels per sensor.). The proposed technology, a thermopile array, allows to measure absolute temperatures in a simple and economical way. Other inexpensive IR sensors can detect only movement in temperature (pyro-electric, also called PIR sensors, as used in the older alarms systems), but this again lacks the advantage that one can detect static situations. An alternative infra technology that can measure absolute temperature is bolometers. With this technology, one can increase the resolutions (for instance 512×512 pixels). FIG. 3 demonstrates temperature sensing in accordance with the IR principle, whereby an object (20) transmits radiated energy (30), captured on a sensor of the array (40) which provides data to a microprocessor (or the like) (50) for computing a signal indicative for the mean temperature (60), more in particular the mean temperature within the FOV of a pixel. FIG. 4 provides a FOV detail of 1 IR pixel with (100) the ideal pixels response (pixels measures the mean of a 3 deg FOV) and (110) the real pixel response (pixel measures energy over a wider FOV (multiplication with the FOV response)). If an object (equal in temperature) falls for 100% within the FOV of a pixel, then this pixel will measure exactly the temperature of the object. In this example the object is then within the 10 deg FOV covered by the pixel; hence, for smaller temperature objects, we need additional data, to calculate the exact temperature on every point (correlation with object definition, historical data of the temperature, . . . ). FIGS. 5A and B show a FOV example of IR sensor array. For instance T037 in FIG. 5B shows the response of pixel 37 as a function of the position of a heater on the vertical line in FIG. 5A. As one can see, 1 point in place will fall within the FOV of typically 10 sensors. So if we would have a hand at 4 meter distance, then instead of 1 pixel showing for instance 31 deg C., we would have 10 pixels with temperatures between 20 and 30 deg C.

The above selection of sensor technologies based on in depth understanding of the needs of the scene surveillance use under consideration requires in addition suitable data handling or data manipulation techniques to realize the enhanced analysis of the scene as indeed the different of nature of the sensor data does not allow (nor would result in any use in) mere addition of those.

In a first realization one can use object tracking on the distance data but by knowing now also the absolute temperature of the object, one can make a distinction between a 'cold' object, and a living person, more over one can easily detect the warm parts of a body (like the head and hands), and hence work on sub object level is necessary, to discriminate the various objects in the scene. Warm objects can further be divided into sub-objects, related to the main warm object (person), but having a different temperature.

In a second realization an even more sophisticated algorithm is provided, based on a full mapping (intelligent combination) of the distance and temperature. The pixels size of the TOF is mostly smaller than that of the thermopile pixels, and therefore the special resolution of the TOF will be very high. The thermopile pixels will have fewer pixels, and the FOV of 1 pixel will be rather large. The mapping algorithm will map a temperature on every TOF pixel.

Figure 1:
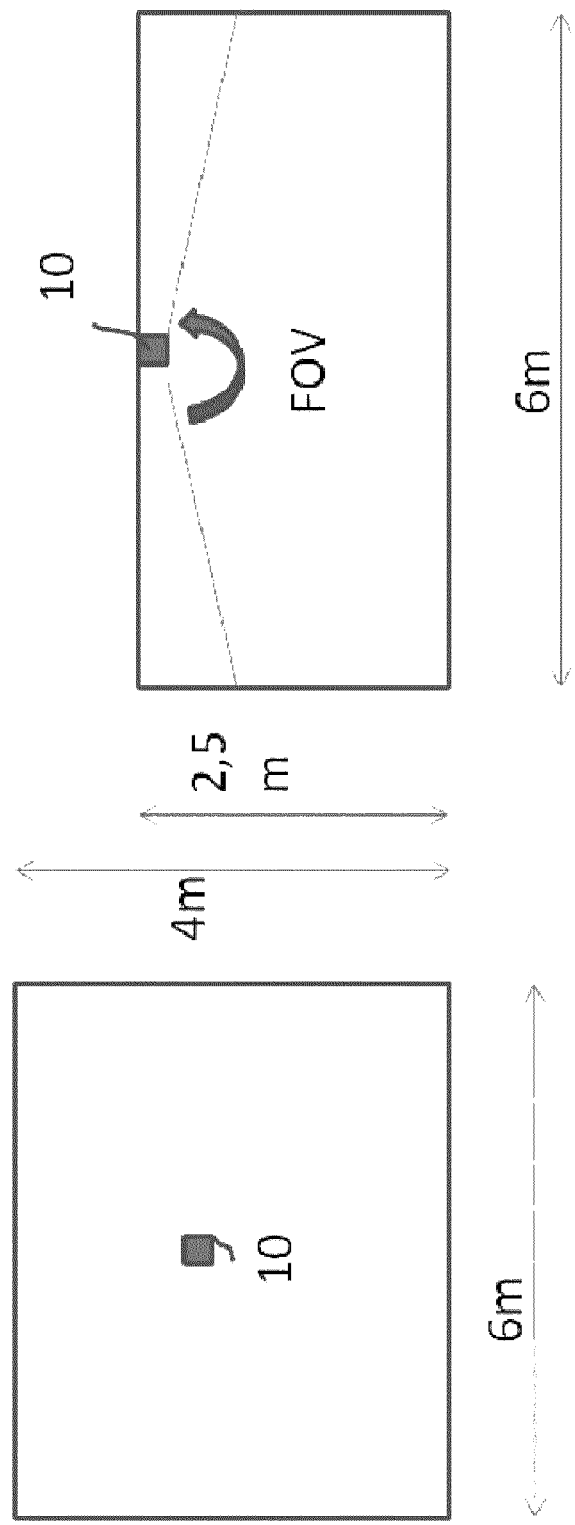
FIG. 1 shows a typical positioning of the sensor cluster.

For use of the invention system and method in the application of fall detection, the sensor cluster is preferably positioned on the ceiling, possibly in the middle of the room. FIG. 1 (left side—top view of a room, right side—side view of a room—not on scale) shows a typical positioning of the sensor cluster (10) but the invention is not limited thereto. Both sensors will have a Field of View (FOV), large enough to overview the full room. A FOV of 160 deg would be advisable. Both sensors will divide this big FOV in a large number of pixels (small FOV area's). A typical pixel size for the TOF would be 160×120, having a FOV pro pixel of around 1 deg. This FOV can be achieved with 1 sensor, using fish eye optics, since the wavelength used is typically around 850 nm (out of the visual spectrum, but still detectable by silicon). The pixel size for the Thermopile typically will be smaller. The wavelength used for passive infrared, is typically between 5 and 10 um. Due to the nature of these wavelength, it is very difficult/expensive to make wide FOV optics, so a possible configuration is using 4 sensors with typical 80 deg C. FOV. One sensor could have 32×32 pixels, so 4 sensors would cover 64×64 pixels, a 1 pixel having a FOV of around 3 deg C.

Figure 6:
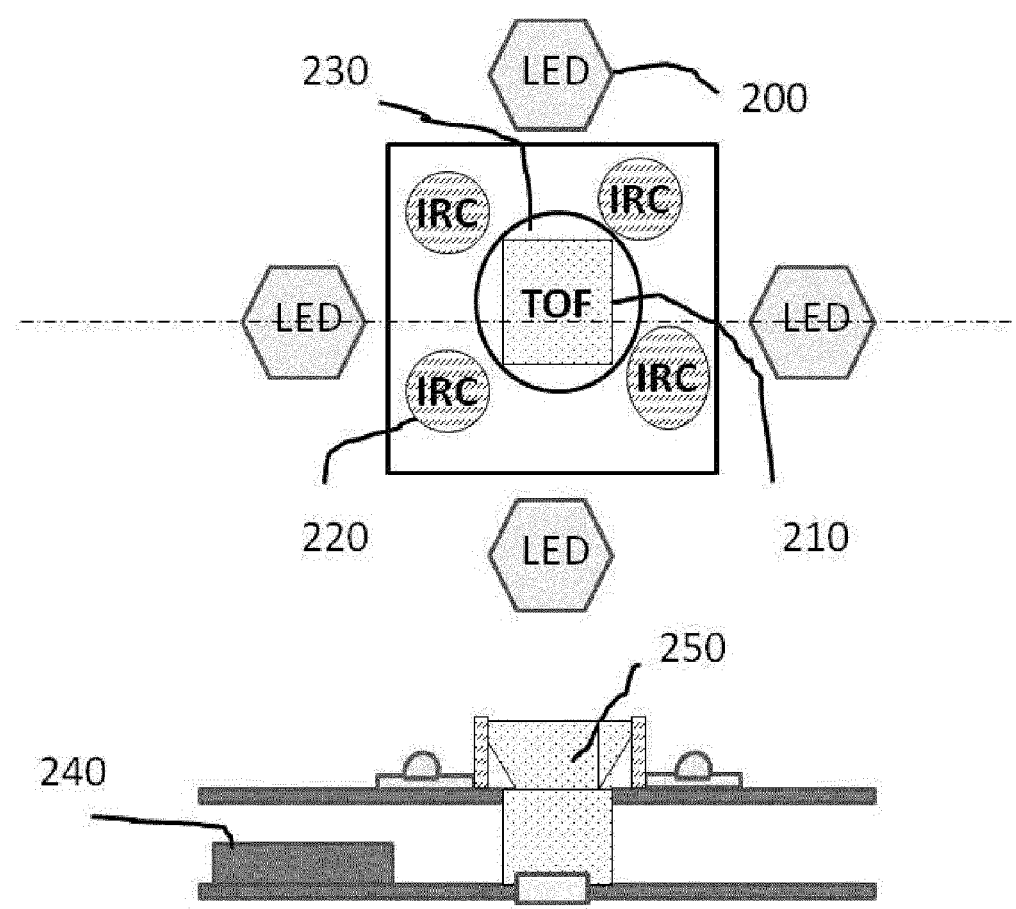
FIG. 6 provides an example of a mechanical construction of the invention.

The strength of the invention for its applications is in the fusion (combination) of both sensors inputs, on which objects are defined, which in time will become more precise. A typical construction is shown in FIG. 6 (top view on top, side view on the bottom of the figure). Here the TOF sensor comprises of LEDs or a TOF light source (200) and a sensor (210). Further there is a plurality of IR sensors (220), a mirror (230), processor unit (240) and TOF optics (250). Due to the mechanical tolerances of the chip position in the chip package, the optics assembly, and the positioning of the sensors on the PCB, there will be quite some variations on the mechanical matching of the ir pixels, onto the TOF pixels. For this, a calibration cycle, after assembly will be done.

Since the FOV of an ir pixel is larger than that of TOF pixels, and even much larger than the ir pixels distance, the invention provides algorithms to be able to map on every TOF pixel, a temperature. To overcome the uncertainty of this matching which would be present if one only considers 1 point in time, the algorithms preferably use also the historical information to improve the matching in a manner beyond mere tracking.

Objects, as well as 'the background' will be defined. The background is what is not moving for a certain amount of time AND what is not a warm object. Objects are items which are moving, or have moved somewhere in time. They will be split up into warm and cold objects. Warm object are defined as 'living' items, as a person, a pet, . . . . Cold objects that do not move for a predefined time (for instance a chair that fell), will become part again of the background. Warm object never will become part of the background. By tracking these objects (which all have their own temperature distribution), one can map their temperature profile onto the TOF pixels.

Once this mapping is in place, the fall detection itself gets much easier. We indeed know the warm living objects, and can detect a fast downwards movement of their center of gravity. The system also allows to detect parts of the object (for instance head, hands, . . . ) so that also pre-fall movements (waving with arms at the beginning of a fall) can be detected.

An important advantage of the proposed sensors is that they also can evaluate the static status after the fall. The TOF sensor can indeed measure the position of the person relative to the ground, of the background (for instance chair, bed, . . . ).

The invention provides for a learning system and learning methods, whereby at least two (linked) sensors interact in time to thereby continuously improve performance by enhancing over time the quality of object (or sub-object) definition and/or detection and/or and tracking. This embodiment of the invention hence uses historical data.

Figure 8:
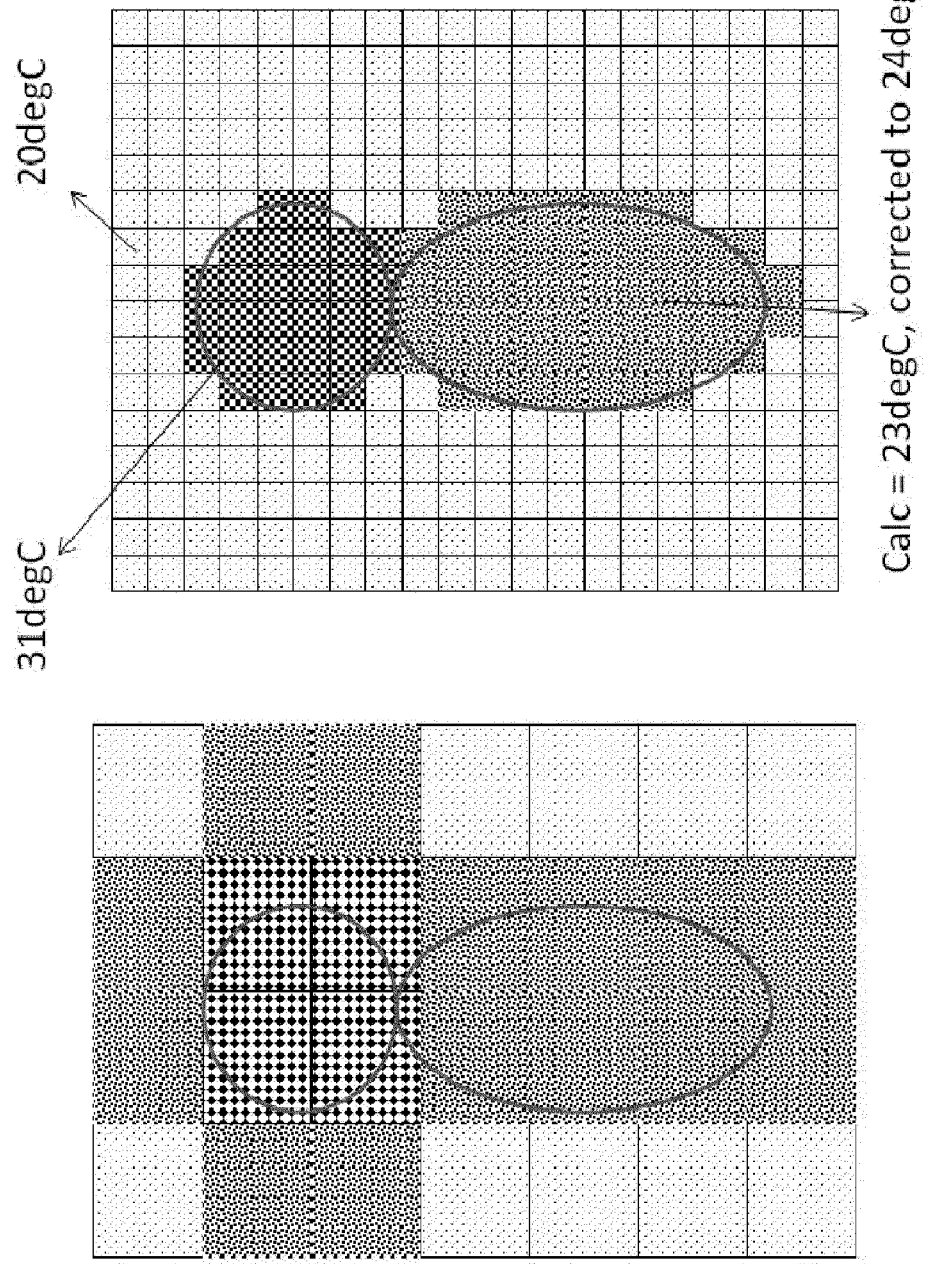
FIG. 8 shows the mapping of IR signals onto TOF resolution to thereby improve the temperature data in accordance with the invention.
Figure 9B:
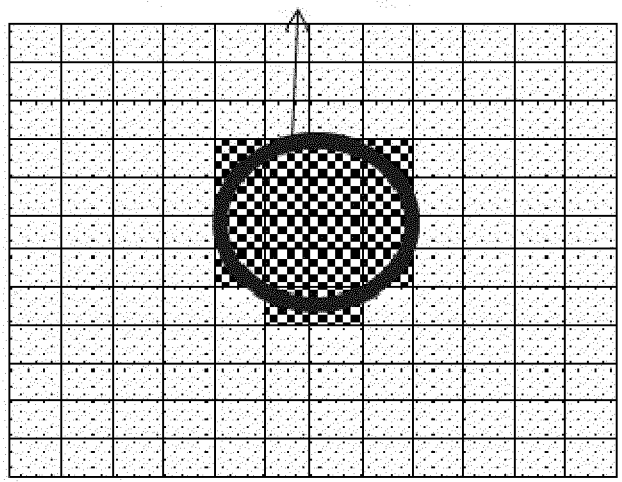
Figure 9C:
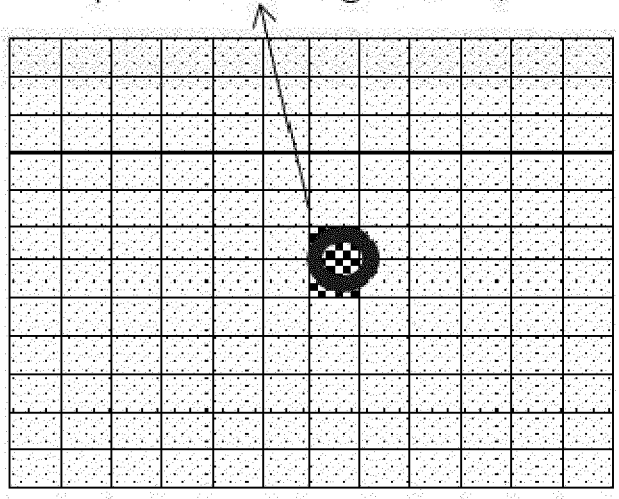

This is now more explained in the FIGS. 8 and 9A, B and C. In FIG. 8, we start from some history data. The left side shows the initial IR resolution. The temperature per pixel is influenced by neighborhood pixels. The right side shows the mapping onto TOF resolution where every sub-object gets assigned 1 temperature. The system knows we have an object before a background of 20 deg C. (from history) since if somewhere in time, there were no objects before the wall (which is part of the background), then some of the pixels only have seen the wall in its full FOV. As such, the temperature of the wall has been measured very precisely. The system also has already split up the object in 2. Warm objects can never disappear. If an object has 2 distinct forms (detected by the TOF), for instance the body and the head, and if the IR sensors indicate a difference in temperature, then the object will be split in 2 sub-objects, that always need to touch each other. All sub-objects will be followed in time. However, sub-objects can also merge in time. For instance an arm, once defined as sub-object, when resting against the body for a long time (for instance when reading) will become a temperature closer to the body temperature. So after a while sitting in a chair, both the TOF and the IR sensor data will be close to each other, and the system can merge again the arm and body to 1 sub-object. So the nr of sub-objects defining an object can change in time. However a warm object itself can never disappear, unless when moving out of the FOV of the sensors. We assume in this example that in this point of time, the system tracks the head and the body as 2 sub-objects. The algorithm now will map the energy detected on all of the IR pixels, onto the 3 split objects (background, head and body). It will use a best fit algorithm to do this. All the pixels with the distance to the background (wall) will be assigned 20 deg C. It has now to divide the received energy info over 2 objects. It will for instance assign based on this 31 deg C. to the head, and 23 deg C. to the body. In case the system has 'more reliable' information of the past, it can take this into account (for instance and decide that the body=24 deg C.). In essence the temperature data is split in depth neighborhood class temperatures.

FIGS. 9A, B and C show an example of the power of tracking with temperature and FOV. We assume a total FOV of 180 degrees. We assume that we have 180 TOF pixels in 1 direction=1 degrees FOV per pixel. We assume that we have 60 IR pixels in 1 direction=3 degrees FOV per pixel. The bottom shows temperature mapped on FOV pixels while the top shows the pure IR pixel data. If once in history, the hand is close to the sensor, the IR resolution is good enough to calculate the temp of the hand correctly (enough pixels are within the area that sees the hand). The further away the hand is from the sensor, the more every IR pixel will see the background, so none of the pixels will read the exact hand temperature (since in its FOV it also will see part the background temperature=20 deg C.). However, since the FOV sensor will give the exact area of the warm object seen by the sensor, it will reassign the energy received by the sensors, onto the warm object (for instance by use of an inverse weighted averaging). So the wall will become 20 deg C. (see before), and the hand will be assigned the calculated temperature. As long as the area of the sum of the TOF pixels is close to the area of the objects (so enough FOV pixels within the object), the results will be fairly correct (see hand at 1.5 m). However if we only have a few FOV pixels (see hand at 4 m), then the area of 2 pixels, will deviate considerably from the object area, and as such the calculated temperature will not be correct. But the system knows the history of the temperature assignment of the hand, and will adjust this calculated temperature (for instance from the calculated 27 deg C. to 29.5 deg C.) for case 3. It will not necessary assign 31.5 deg C., since it will use a weighting of all inputs, to come to a best estimate. This will take into account that objects can and will change of temperature within certain limits: —hand can only change of temperature slowly (when not touching objects). —the temperature of the head can change depending on the positions (for instance when standing under the sensor, the system will measure the temperature of the head (for instance 29 deg C.), while if walking away from the sensor, the system will see the face itself (for instance 31.5 deg C.). It is important to acknowledge that the sensors measure the surface temperature. So short hair will give a closer temperature to the skin temperature than very curly hair. The surface temperature of a hand will cool down more when there is a wind going through the room (or equivalent, when the hand moves in relation to the air).

Figure 10:
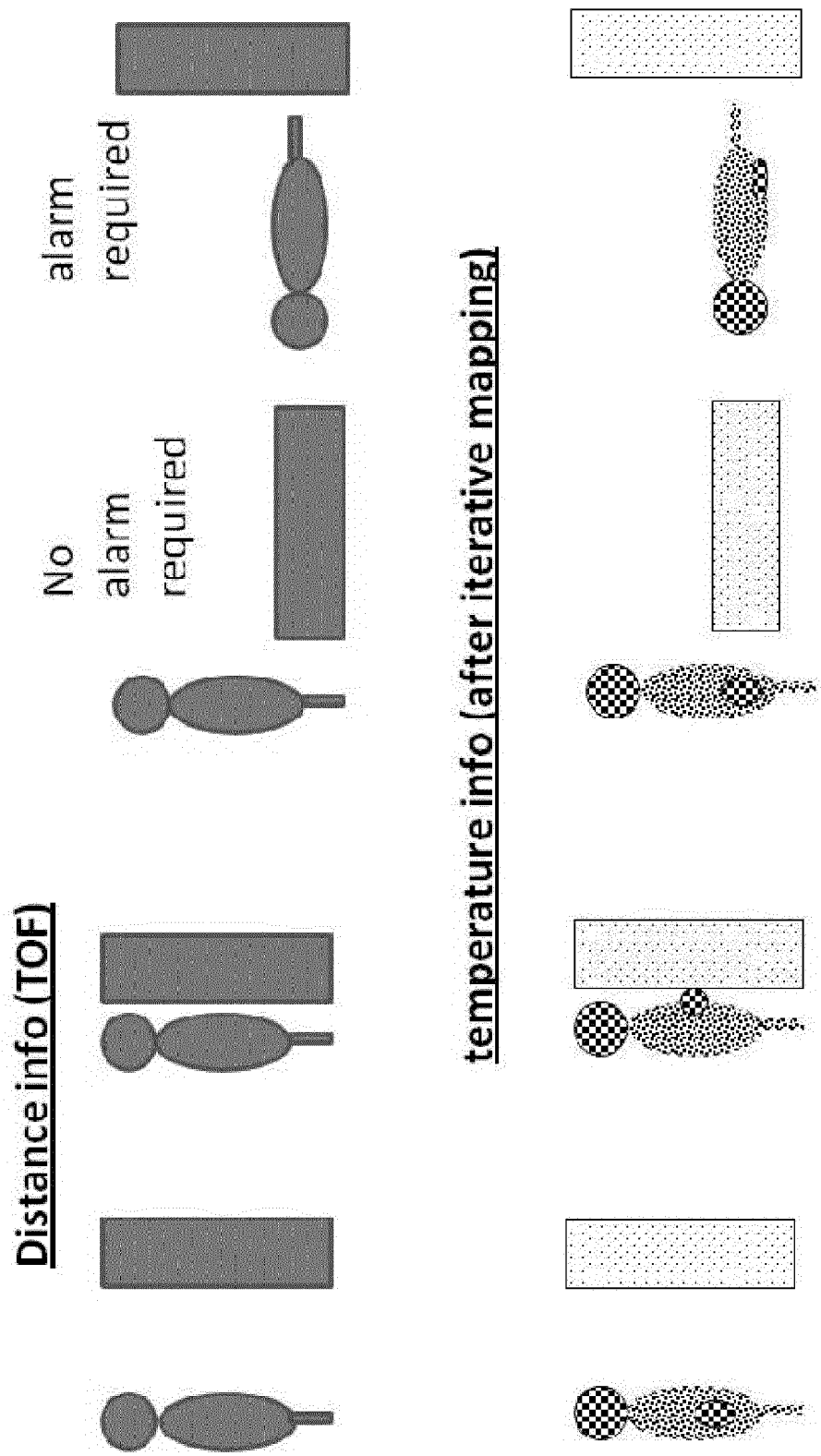
FIG. 10 illustrates the operation of the methods for detecting a person falling against cupboard.
Figure 11:
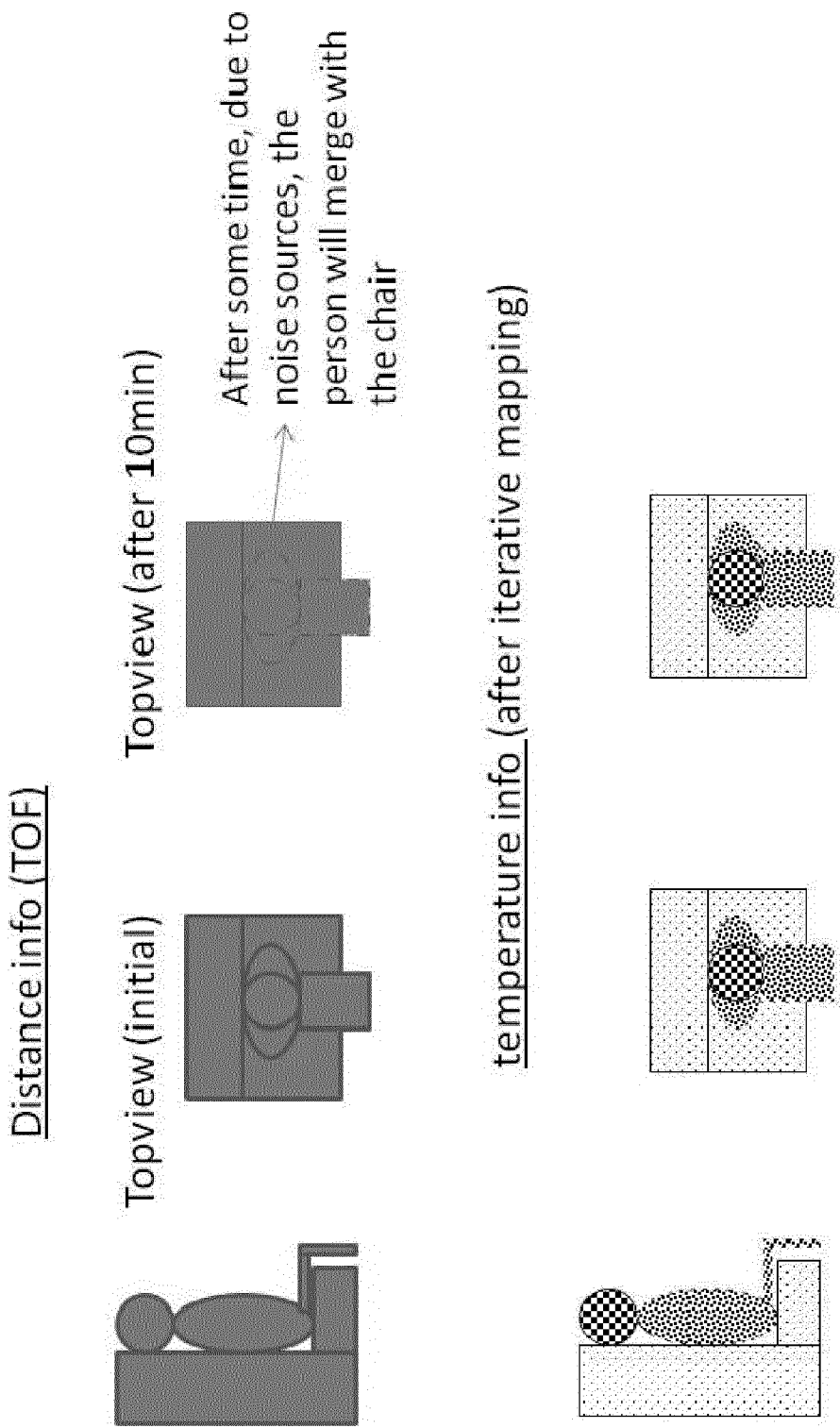
FIG. 11 the operation of the methods for detecting person in a chair in time.

FIG. 10 shows the advantage of the temperature mapping. When using a pure FOV sensor, and when a person runs into a cupboard, the system can get confused. If now the cupboard, or the person falls, the system will not know for sure whether there is a person falling. By tracking the temperature, we can easily make this decision. Alternatively FIG. 11 shows that when a person goes to sit in a chair, a pure TOF sensor will be able to track this. However, when the person is sitting still in the chair for a long period, the TOF can lose track: due to noise on the pixels, sun shining on the person, . . . the imprecision on the distance can become so high, that the system will lose the person. Again, the proposed system will keep track of the 'warm object', and can easily do this by tracking the head with its temperature sensor.

Figure 12:
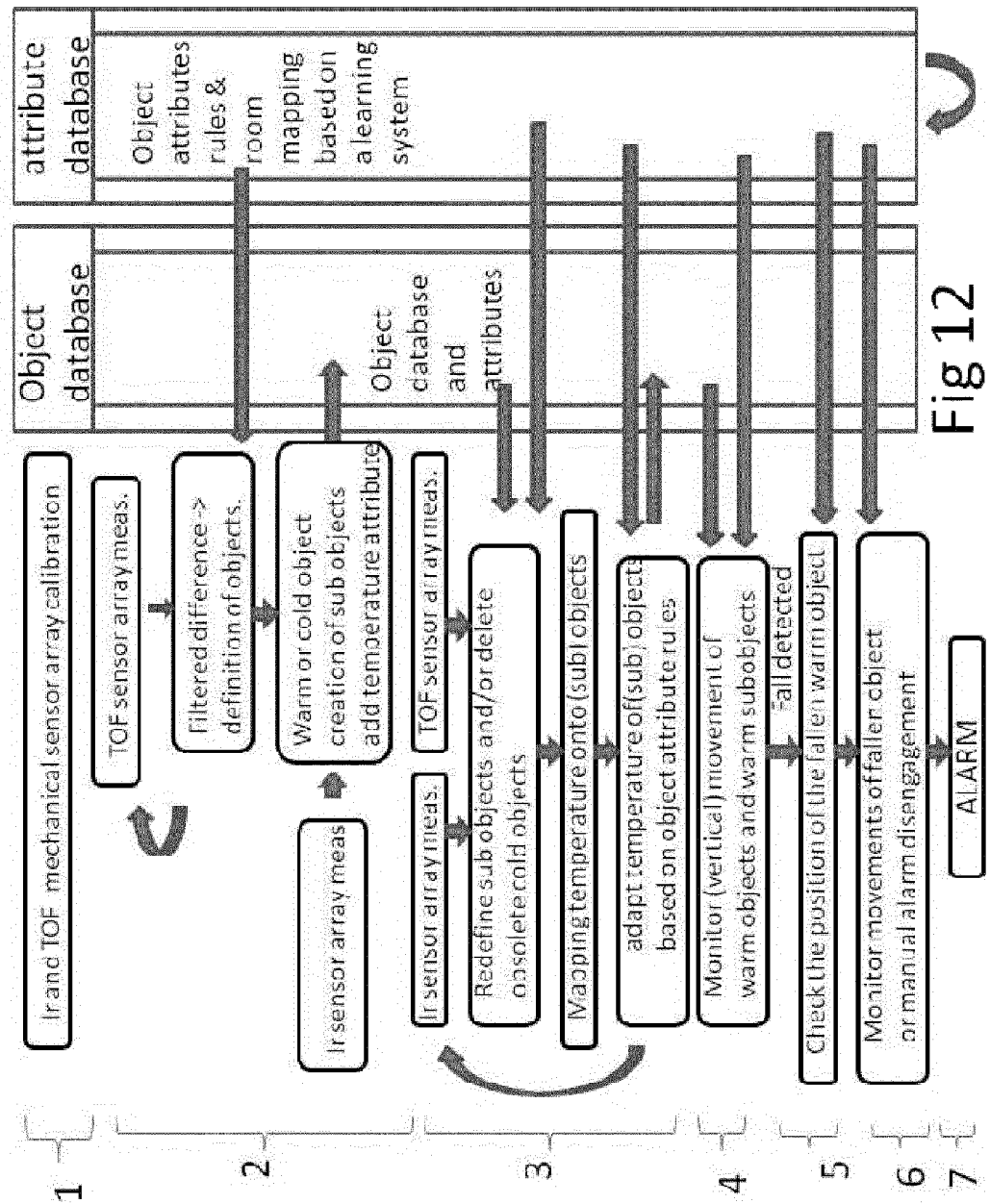
FIG. 12 shows a more detailed flowchart of an embodiment of the invention.

FIG. 12 shows a flowchart of an embodiment of the invention. One recognizes a step of calibrating (1). The assembly of the IR sensor and the TOF sensor itself will have deviations. Also the assembly of the sensors in relation to each other, including the optics can have further deviations. This will be corrected with an initial calibration step. One recognizes another step of object creation (2). This routine will continuously monitor the TOF data variations, within a predefined timing. When there is a movement, not linked with a predefined object, a new object is created. This can be due to a movement within the room (for instance fallen chair), or a person entering the room. The system has learned the most common entry and leaving positions of warm objects (for instance a door) and this is stored in the attribute database. This is then again an input for supporting the object creation module. Once a new object is detected, an IR image map will be used to classify the object into a cold or a warm object. If a warm object, possibly already sub-objects will be defined. The end results (object definition and temperature) will be stored into the object database. Yet another step is object tracking and updating (3). This routine will continuously input new IR and TOF array data. It will first verify if the existing warm sub-objects are still valid, or if some have to be added or merged. It also will check whether cold objects are still valid (for instance when not moved for a predefined time). Parameters for these decisions will be taken from the attribute database. Once the (sub) objects are fixed, then the IR array data will be used to map a temperature on every of the (sub) objects. The final (sub) objects position and temperature will be stored in the object database. Yet another step is movement detection (4). This routine will continuously monitor the movement of the warm objects and sub-objects, as available in the object database. It will compare this with the rules stored in the object attributes database. Outcome of this routine is whether or not a fall movement is happening. A further step is fall verification (5). When a fall movement has been detected, this module will check the end situation (position of the warm object in relation to the room mapping—background), and based on the rules defined in the attribute database, it will conclude whether or not we have a valid fall event (for instance a person sitting fast in the chair will be seen as a fall movement, but not classified as a fall). Another step is pre-warning (6). When a fall has been detected, then the system will check if the person can recover (for instance by standing up again), or if the alarm can be stopped (for instance by a human intervention, when for instance another person in the room did fall, but does not need external support). Another step (7) is to start an alarm. When no recovering or stopping actions occur within a predefined time (attribute database) then an alarm will be given. In summary various steps of a method are disclosed which can be implemented either separately or combined. Some steps are initial steps (for instance the calibration step) done once or once in a while (for instance to cover for small changes of the setting over time). Some steps are run in parallel (for instance the object creation, object tracking and updating and the fall movement detection). Besides the method, the invention discloses a system or an assembly (sensors, optics and other electronics) and related software or supporting software structures as a specialized object database.

Figure 7:
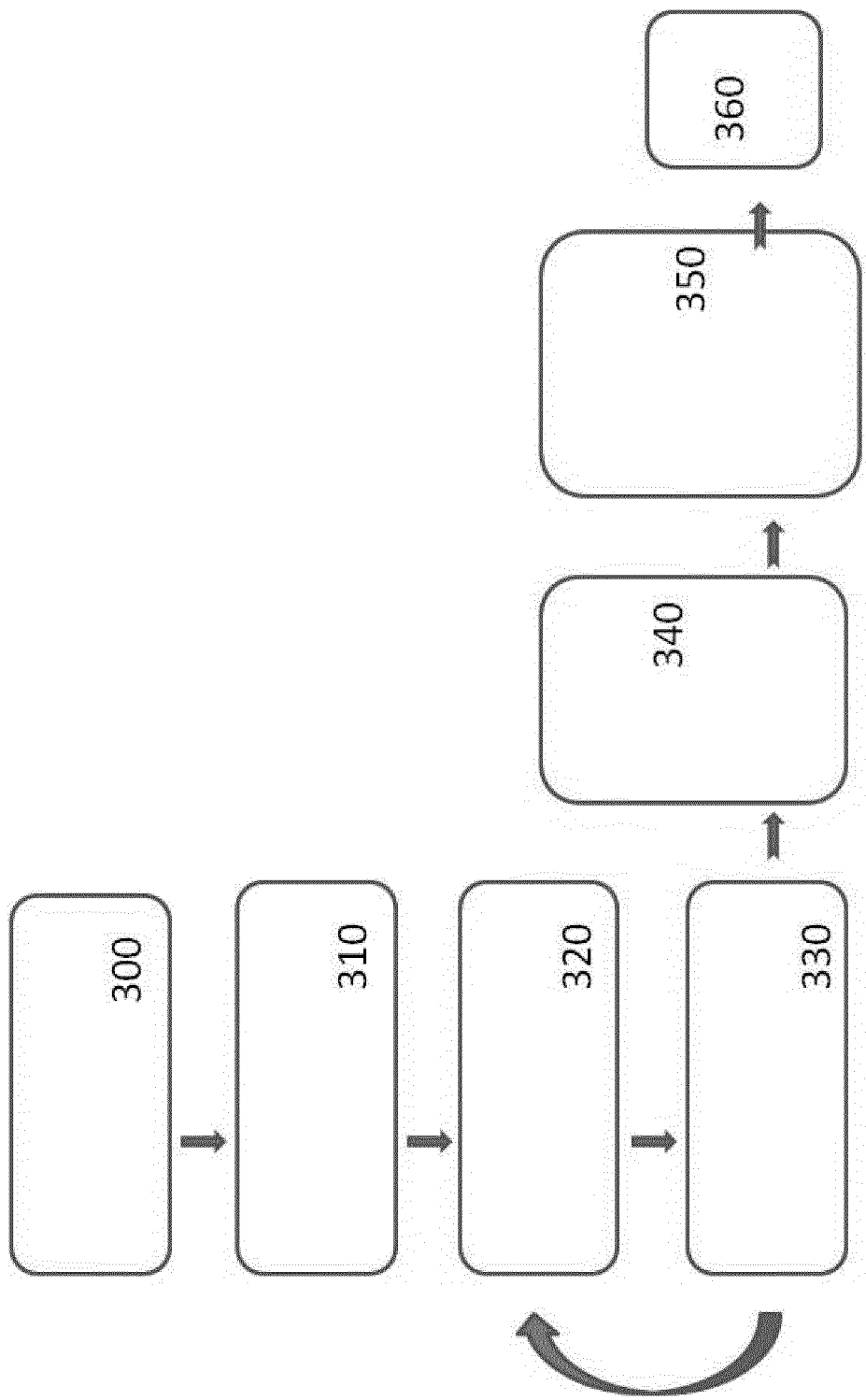
FIG. 7 show a realization of the methods steps, here calibration and further algorithm.

Note that FIG. 7 shows a realization of the methods steps, here calibration and further application of the algorithm. A step (300) of mechanical matching the IR and TOF sensor is identified. Further a step (310) of initial mapping of IR and TOF pixels. Further a step (320) of defining and tracking of object or sub objects in time. The next step (330) provides the updating of the IR mapping to TOF pixels. Step (340) provides the fall detection (when a warm object moves towards the floor), followed by verification (350) of the final position of the person. Finally an alarm is started in step (360). Note the continuous loop between steps (320) and (330).

Further the combined data approach also allows for active steering of the active sensor, for instance providing more light into zones where due to external circumstances such as sunshine (detectable by the temperature sensor) the performance of the TOF sensor is less reliable. Indeed a potential problem of a pure TOF system is that the pixels can saturate due to direct sunshine in the room. This can be overcome by reducing the integration time of the pixel, but this has as consequence that one has to apply a very small duty cycle on the lightning system (all light energy has to be released in for instance 5% of the time). This will have a negative impact on the reliability and/or the cost of the lightning system of the TOF. Now, by using the IR array data, and the implemented algorithms, one can also tackle this problem: If saturation would occur, then in $1^{st}$ instance, the system would rely on the IR array for tracking. Whenever the system would need more additional info (for instance 1 time per second, or more in case of an event), then the TOF duty cycle would be changed to tackle the saturation effect. The same will happen after the fall, since only the TOF can reliably verify the final position of the person. Since we might use different LEDs for different FOV areas, one can decide to only activate 1 led in the reduced duty cycle mode. With this system, the reduced duty cycle mode would be used very selectively (only those LEDs which are required), and only when needed. As such, the lifetime reduction effect on the lightning system can be limited.

Figure 15:
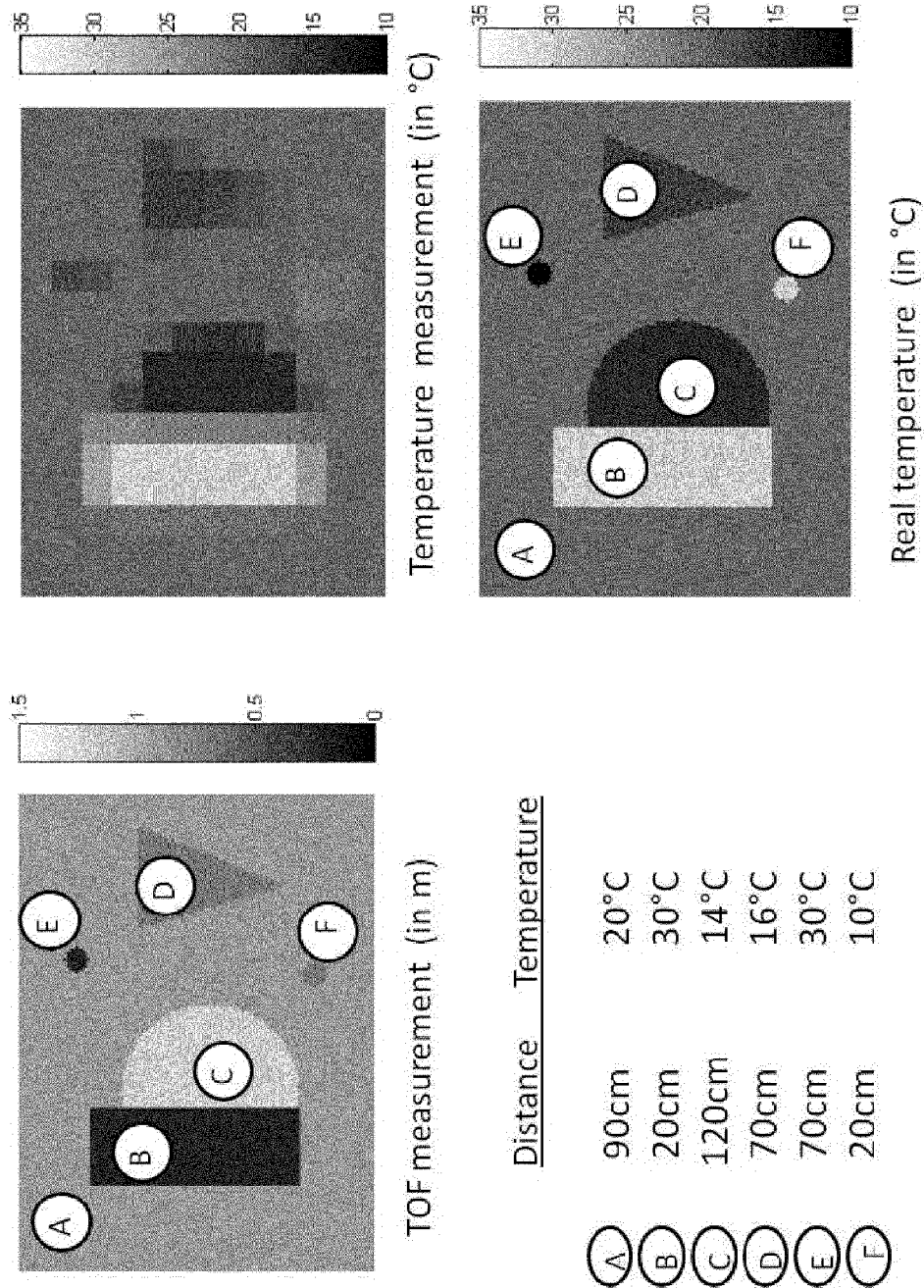
FIG. 15 shows an experimental scene to illustrate the performance of the invention.
Figure 16:
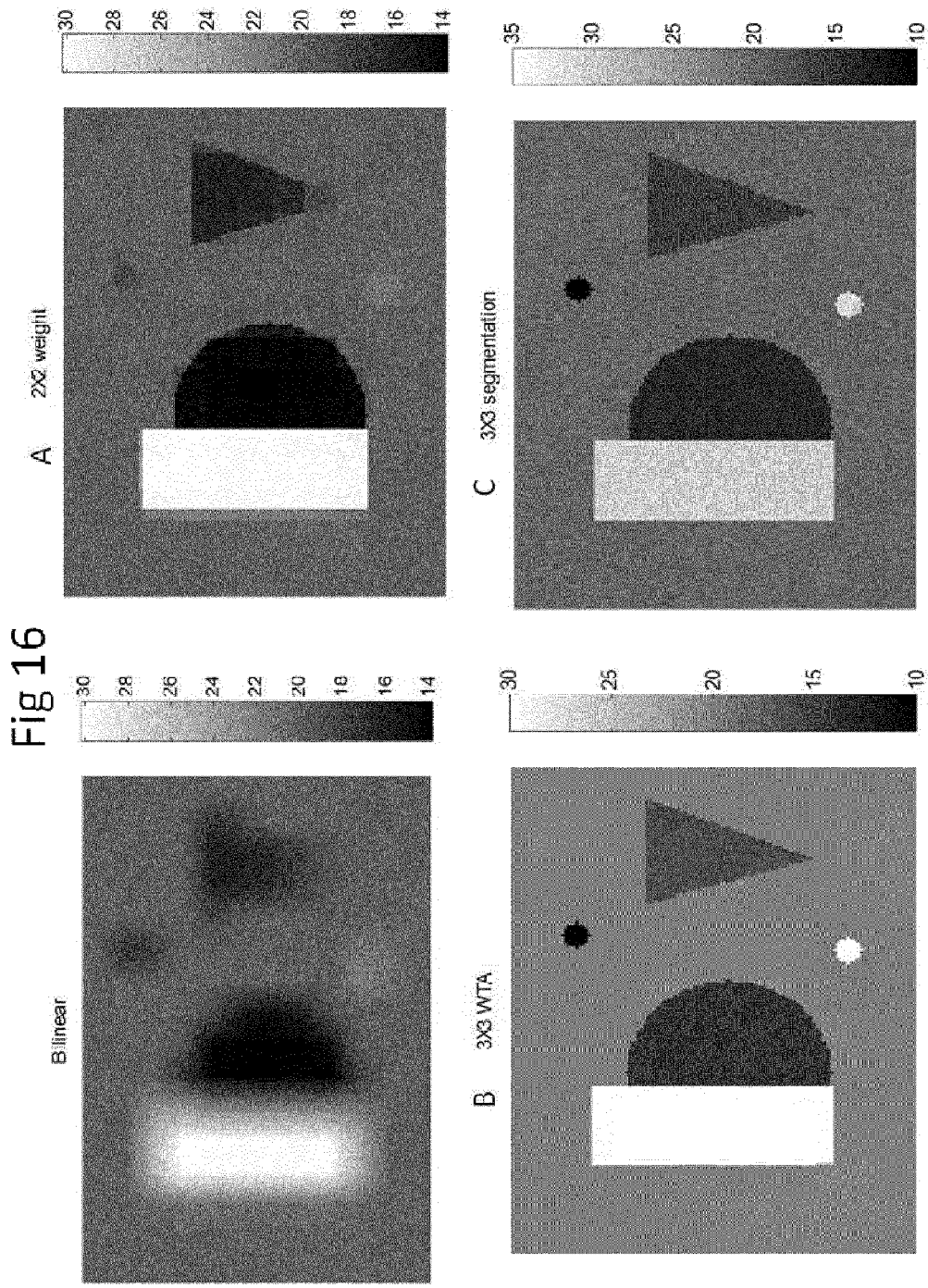
FIG. 16 shows the result obtained by various embodiments of the invention, compared with a prior-art method.

The invention relates to static and/or dynamic improving of a temperature array (and mutatis mutandis a distance or depth array). The temperature array can be improved using the distance info. The strength of this innovative technique can be shown by comparing performance based on an experiment. In FIG. 15 a scene describing 5 objects on a background is shown, with data expressing the distance in meter, other data expressing the measured temperature in deg C., on a lower thermopile resolution to be compared with the 'real' temperature. Various common techniques like nearest neighborhood interpolation, bilinear interpolation or cubic interpolation used to upscale an ir array, using the standard interpolation techniques, lead to deviations that can easily be 5 deg C. and more, and mean errors of respectively 0.78, 0.83 or 0.80. The temperature improvement that can be obtained, by using the pixel depth information, in accordance with the invention, is now described. For every depth pixel (so on TOF resolution), a temperature is calculated, based on the depth information, and optionally also the confidence of this data, of the surrounding temperature pixels. Consider the result for the following experiments A, B and C in FIG. 16, compared to the prior-art technique result shown in the top left corner of FIG. 16. In a first experiment A an interpolation is used, where the weighting factors are based on the depth information (and optional on its confidence level). In example B and C, the temperature pro original temperature array pixel, is split up towards 2, 3 or more temperatures, linked to 2, 3 or more mean height levels, measured (by the TOF sensor) within this original ir array pixel. This can be done with or without maintaining the power budget. This powerful method will allow to recalculate temperatures towards its correct value, which can be lower or higher then all original measured values. In an embodiment of the invention this is done by performing an inverse weighted averaging, meaning by solving an equation wherein the temperature to be determined is part of the weighted averaging part of an equation while the outcome of the weighted average is known. In B, an algorithm is used which does not need prior segmentation. In C, prior segmentation info is taken into account. Those experiments show that he temperature error pro pixel drastically can be decreased (mean error of 0.21 for experiment A), while for methods B and C (mean error of 0.09 for experiment B and 0.087 for C), one can also correctly measure the temperature of objects smaller than the original temperature measurements (on lower spatial resolution). In this example overall temperature deviation is reduced with a factor of 10. A further improvement is to process several iterations of the above process on the same static data to further enhance the temperature data. A further major improvement in the recalculation of the temperature and distance map in accordance with the invention can be achieved by additionally taking the time information into account. The recalculated confidence levels assigned to distance and temperature do not only rely on the info on 1 temperature and 1 distance map, but can take into account the accumulated confidence data. A wall which has a fixed distance, and only a slow changing temperature, will gradually get assigned very high confidence levels. These will then be used to more correctly calculate the temperature on objects moving before this wall. Another factor of improvement can be achieved by taking into account object attributes and rules. For example, when tracking a person, one has learned in time its height & volume (attributes), while for the change in time of the temperature, one will use predefined rules (max change of temperature in function of object movement and position, air flow predictions—based on gradients in wall temperature—, . . . ).

Figure 13:
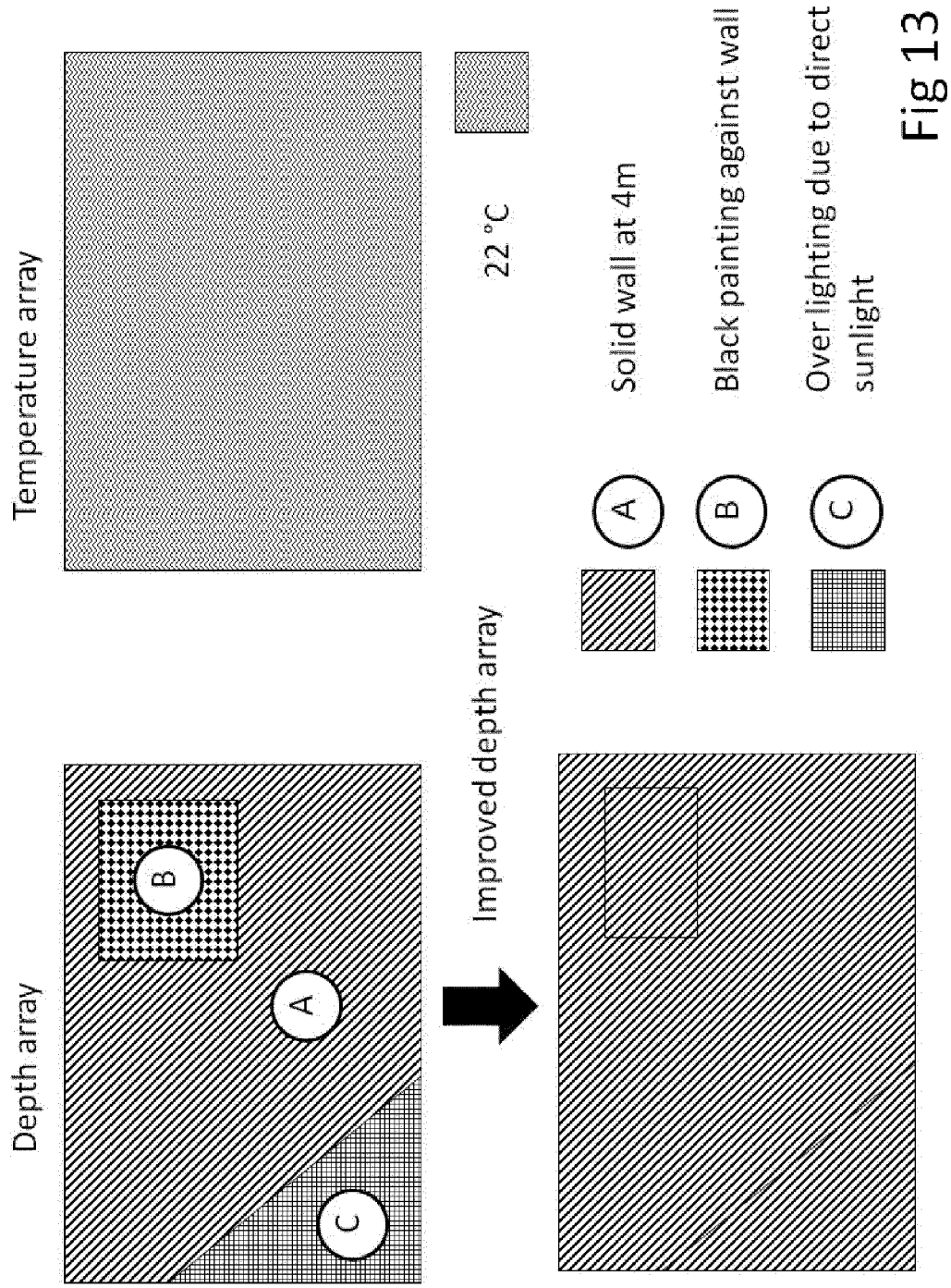
FIG. 13 shows the concept of improving depth data.

As discussed above the depth array can be improved using the temperature info. An example can be found in the FIG. 13, where we show a part of a solid wall at 4 meter. The confidence of the depth in the wall area A is very high, while the depth info at 2 parts of the wall is very unreliable: a part (A) of the view has very low confidence (low light reflection) due to a black painting on the wall; a part (C) of the depth sensor view is overexposed due to direct falling sunlight. In both cases, the confidence level of the depth data of these 2 parts is 0 (item C), or very low (item A), while the confidence level of the temperature info is very high. Since from history (time info) we know that we do not have any other objects around, based on the equal temperature info, and we see no important temperature steps in this part of the FOV, we assign the A-depth to area's B and C, with an increased confidence level.

Generally stated the data manipulation means adapts part of said second data set by use of said first data set, wherein said adapting of part of said second data set is based on classifying pixels in said first data set in a plurality of temperature neighborhood classes based on said first data set; determining confidence information (on the depth values but also for instance on the classification); adapting second data set pixels in the temperature neighborhood class with the high confidence; and recalculating part of said data set in said second data set in one of the other temperature neighborhood classes with a lower confidence by use of said adapted second data set pixels.

Figure 17:
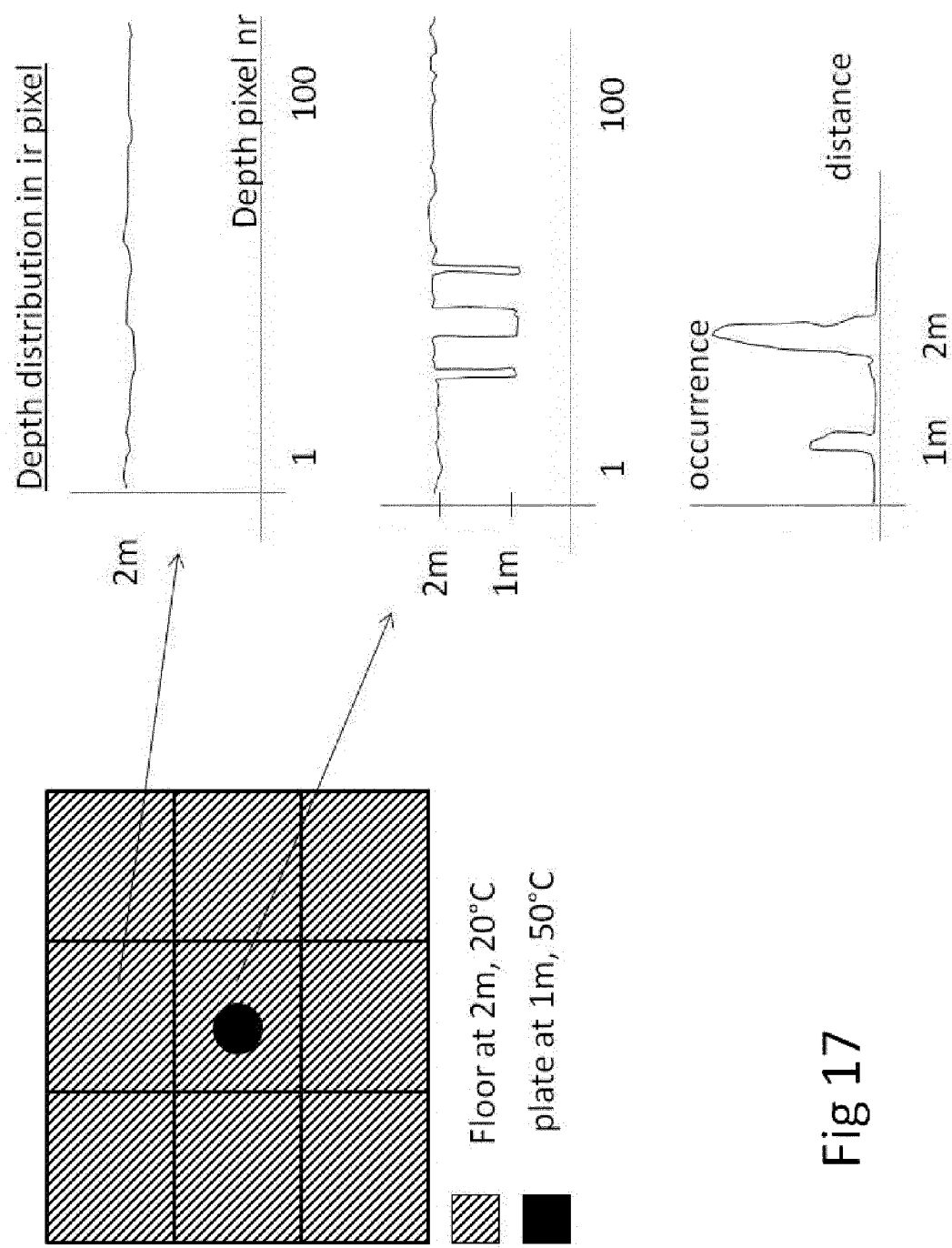
FIG. 17 shows a simplified temperature splitting example as used by one of the embodiments of the invention.

FIG. 17 shows a further explanation of one of the embodiments of the invention. Assume that 1 ir pixel corresponds with 100 TOF pixels. The 9 ir pixels shown see a ground floor at 20 deg C. at 2 meter (after distortion correction), but the middle pixel also contains a solid plate. This solid plate at 1 meter has a diameter of 18 cm. All outer ir pixels measure approximate 20 deg C. being the wall temperature. The middle pixel will see: 90% of its FOV at 20 deg C. and 10% of its FOV at 50 deg C. When we simplify the energy radiation laws to a linear equation (6 W/m2/deg C.), the sensor will measure: (1*50+9*20)/10=23 deg C. So this is the only temperature information we will receive from the temperature sensor. From the depth class algorithm, we know that we mainly have 2 depth clusters (depth neighborhood class): at 1 meter and at 2 meter (mean distance 1.9 m). We now have 2 unknowns (temperatures at 1 meter, and at 2 meter), and only 1 equation (the energy sent by 100% FOV at 23 deg C., should be the same as the sum of the energies sent out by the 2 defined objects). This missing information is provided by the temperature of the other ir pixels, but weighted to the difference in depth to the pixel under splitting. In this simplified case, we see that we have 8 other pixels at approximately the same height (2 m), and with only 1 depth (see depth distribution), so these 8 temperature pixels have a high confidence. We assign now the same temperature of 20 deg C. to the 2 m distance depth class. Now that we know this temperature, we can calculate the temperature at 1 meter) from the power equation: (1* t_1 m+9*20)/10=23 deg C., and we will find that t_1 m=−50 deg C. as the temperature of the small object. This method is called the inverse weighted average. Note that this is a rather ideal situation, where the nr of depth classes=2, and the confidence of the one of the 2 depth class temperatures is approximate 100% (since 8 other pixels with high confidence are on approximately the same height). The same reasoning will apply when we have 3, 4 of more depth classes. In this case, we will have 1 (power) equation, and 3, 4 or more unknowns. The unknown temperatures will be calculated based on the information available in the other ir pixels, taking into account their confidence level (based on their depth distribution, and possible historical information) and the difference in depth towards the pixel under splitting.

Note: Instead of using pure depth difference as input for weighting the contribution of the other ir pixels, one also can use prior segmentation information. The ir pixels within the same segmented object, will receive a high weight factor to calculate the temperature of the distance class corresponding with this (sub) object.

FIG. 18 demonstrates that after having improved the original temperature data, we can more precisely assign a temperature to every depth pixel. In this example, we have 100 times more TOF pixels than IR pixels. For every TOF pixel, a temperature will be calculated from the available ir temperature pixels, but after the splitting step. In this example, we have 8 original ir temperatures plus 2 splitted ir temperatures, so 10 in total, all linked with their depth. The temperature, linked to every TOF pixel, will use a weighted average of these surrounding ir pixels. The contribution of every of these 10 ir pixels, will depend on the inverse of the height distance between this pixel and the TOF pixel. Before the splitting, the max available temperature (of the 9 pixels) was 23 deg C., after splitting the max is 50 deg C. As can be seen in the figure, now all TOF pixels can be assigned with the correct temperature, even if this is higher than the max temperature of the ir sensor:

the TOF pixel (510) looking to the floor has a depth of 2 meter. It will see 9 original ir pixels with approximately the same height. Hence the temperature corresponding with this TOF pixel (510) will be calculated to approximately 20 deg C.

the TOF pixel (500) looking to the plate has a depth of 1 meter. Hence it will see only 1 ir pixel (part of the splitted ir pixel) with approximately the same height. Hence the temperature corresponding with this TOF pixel (500) will be calculated to approximately 50 deg C. Note that this example is a simplified one. Please note that during the splitting step, we can create temperatures higher or lower than the original ones. During the step where we assign temperatures to every TOF pixel, we use a weighted average of the newly (splitted) ir pixels.

In the above one recognizes that as part of said adapting of part of said first data set the original pixel temperature data in said first data set is split in a plurality of depth neighborhood class temperatures based on said second data set. With a depth neighborhood class is meant a set of positions in the scene and the corresponding pixels being at more or less the same depth (and hence presumably belong to the same context like an object). Further one observes that a step of determining confidence information of the temperature of pixels within said depth neighborhood classes; and use of said confidence information for said adapting of part of said first data set. In one particular embodiment said adapting of part of said first data set is based on selecting first data set pixels in the depth neighborhood class with a first confidence level, preferably a high, confidence level; and recalculating part of said data set in said first data set in one of the other depth neighborhood classes with a second confidence level by use of said selected first data set pixels, whereby said adapting of part of said first data set in one of the depth neighborhood classes with a second confidence is based on recalculating part of said data set by an (inverse weighted) averaging of said selected first data set pixels and the first data set pixels under recalculation, the inverse weighting is based on the distance as seen in the second data set.

More generally speaking the invention demonstrates use of data of different nature (temperature and depth or distance) with a difference in resolution and/or difference in FOV, wherein in the methods for data enhancement, various insights and physical laws are used, such as use of energy radiations laws, to create a sufficient set of equations. One of those reflects that one sensor sees a combination of underlying temperatures. The insights in the scene under study can be obtained by analysis of the other data set of distances, and providing missing information by use of the temperature of the other ir pixels, whereby within such use again a variety of information is used such as again the depth and/or confidence information and/or further scene knowledge like assigning of data to objects and/or the belonging to a depth neighborhood class. In a preferred embodiment the depth information is used as part of a further weighting procedure. Alternatively said the temperature information content in the original temperature array will be increased by splitting the original mean temperature per ir array pixel into 2, 3 or more temperatures linked to depth neighborhood classed (as defined above). Said depth neighborhood class determination can be assisted by object recognition or vice versa. This increased temperature information per ir pixel will be calculated from the other ir array pixel temperatures, knowing their mean depth, while maintaining the power budget (the sum of the energy of the n new temp=equal to the one of the original temp) In order to apply the correct weight factors to these other ir pixel temperatures, a weight factor based on the distance between these other pixels, and the pixel under modification is used and/or the confidence of the other pixel temperature is taken into account In summary the provided system (sensors and data processing means with adapted methods) support applications where both a dynamic and static evaluation of the sensed scene is advisable for reliable detection performance. More in particular the choice that one sensor related to an object (or sub-object or parts thereof) properties enhances tracking and/or introduction of application intelligence via typical object or sub-object behavior (see waving in fall detection as example) or characteristics (for instance temperature distribution based or relying on the temperature dynamics of such (sub-)objects). Moreover the dual sensing enables logic exchange of the information context of the related signals, by defining notions of background in terms of both signals, by defining objects in categories also based on both signals. One can state that the data manipulation results in defining such concepts for further use in an application.

Figure 14:
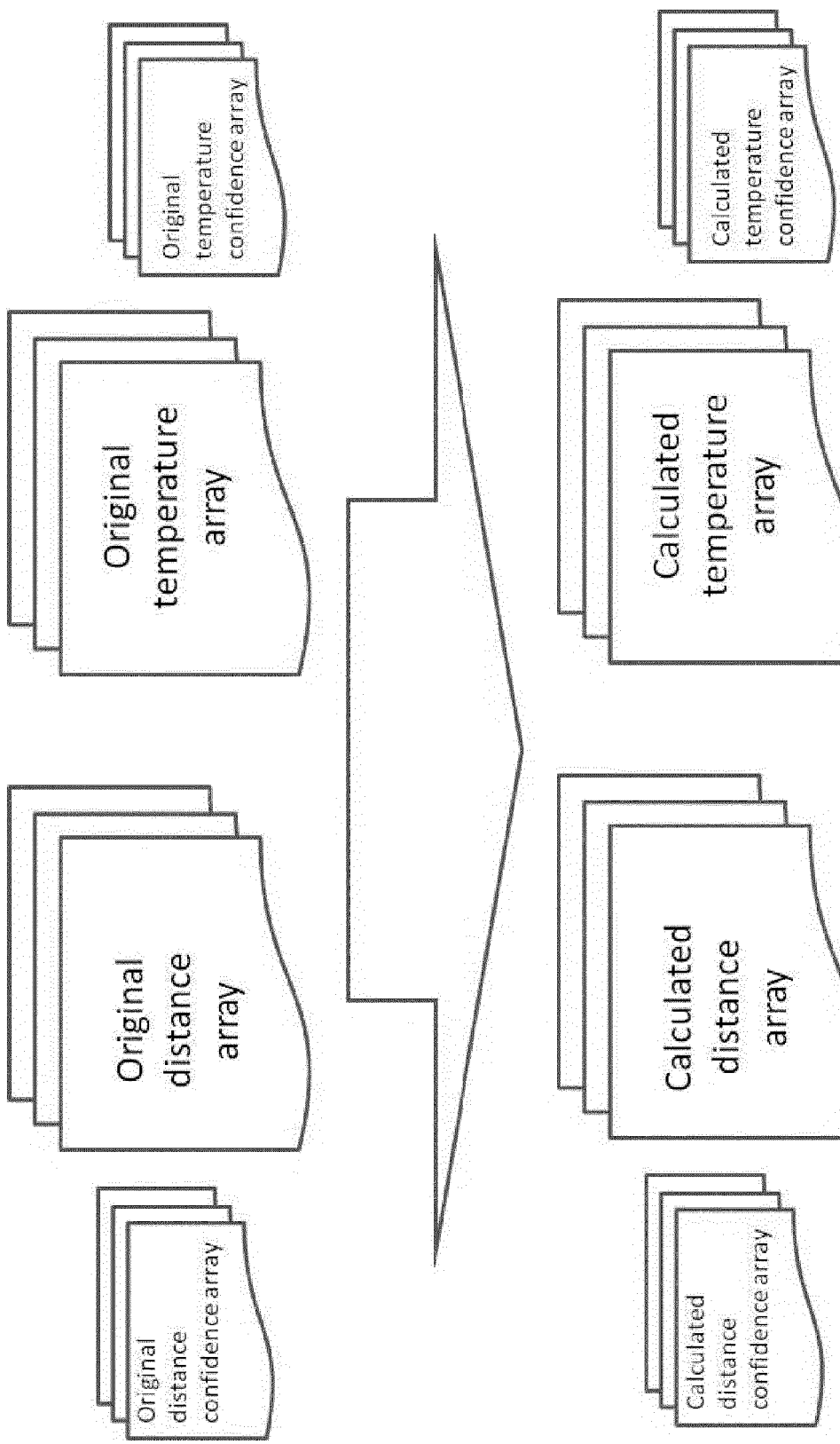
FIG. 14 shows the various data sets used in accordance with the invention.

Moreover said data manipulation means uses at least one of said first and second data sets to support enhanced data computations on at least the other one of said data sets to generate said scene data. Moreover in said enhanced data computations one or more individual pixel values are changed. Further while described in more detail herein for the case wherein temperature data is adapted or recalculated based on distance data, the opposite case is equally possible and even a combination of those. Indeed one of the embodiments actually stresses the performance of various loops, going from temperature data to distance data and vice versa, even go along the time axis, by taking into account past data (e.g. a mere averaging out or even also here using confidence based weighting of such data) and/or even a loop back and forward to higher abstraction levels such as objects, and using additional information about those such as their temperature dynamic properties or even other properties (speed of movement). Also the loops around the various methods in accordance with embodiments of the invention can be used, e.g. weighted and inverse weighted techniques and/or splitting and weighting and/or inverse weighting or combination of all of those. The invention exploits the different nature of the two used data sets, in that for instance in the distance or depth data it may recognize discontinuities to which it attaches implicit or deduces a physical reality to correct the temperature data (by making (linear) approximations or more complex computations based on the laws of radiation, to thereby determine energy contributions). The moving back and forward in the data sets shows to be advantageous in that re-applying of the methods for distinguishing objects may lead to detection of new objects, not found in previous iterations as they are blurred in the original data. As shown in FIG. 14, starting from original data of distance and temperature, calculated arrays are constructed and besides modifying this data in accordance with the invention (and optionally also including resolution adaptation) also increased corresponding confidence data is constructed. Note that when using resolution adaptation this might be performed either on the original data first or as an intermediate step. Hence while said data manipulation means uses at least one of said first and second data sets to support enhanced data computations on at least the other one of said data sets to generate said scene data, in parallel confidence information on one or both of said data sets are created and used in said data computations. Note that FIG. 14 is an abstract representation of the above concepts. In its implementations one does not necessarily have to construe different arrays although this might be one of the implementations. In accordance with the invention the data manipulation means adapts part of said first data set by use of said second data set. In an embodiment thereof said adapting of part of said first data set is based on recalculating part of said data set by (local) filtering first data set pixels, wherein in a further embodiment the filter coefficient is based on said second data set either explicitly or implicitly for instance by neglecting pixels not considered part of the same depth neighborhood class. In an even further embodiment said adapting of part, or whole, of said first data set (in value) is based on recalculating part of said data set by weighted averaging first data set pixels, whereby the weight factors are based on said second data set. The above describes therefore a combination of use of local (neighboring in depth) pixel information with the learning of the physics leading to certain data from a certain scene.

The invention claimed is:

1. A system for capturing data of a scene, the system comprising:
   a. a first sensor, measuring temperature, providing a first data set provided in an array format;
   b. a second sensor, measuring distance, providing a second data set provided in an array format; and
   c. data manipulation means using at least said second data set to support enhanced data computations performed on the first data set to adapt the first data set by filtering or averaging first data set pixels to generate said scene data; wherein said adapting of part of said first data set is based on recalculating part of said data set by filtering first data set pixels, wherein as part of said adapting of part of said first data set the original pixel temperature data in said first data set is split in a plurality of depth neighborhood class temperatures, based on said second data set.

2. The system of claim 1, further comprising determining confidence information of the temperature of pixels within said depth neighborhood classes; and use of said confidence information for said adapting of part of said first data set.

3. The system of claim 1, wherein one or more of said adapted first data set pixels of which one or more is part of said depth neighborhood class temperatures, is adapted based on recalculating part of said data set by an inverse weighted averaging, the inverse weighting being based on the distance as seen in the second data set, in combination with filtering first data set pixels.

4. The system of claim 1, wherein said first sensor is an absolute DC temperature device.

5. The system of claim 1, wherein said first sensor is based on an array of IR thermopiles and/or said first sensor is based on an array of a bolometer.

6. The system of claim 1, wherein said second sensor is an active sensor.

7. The system of claim 1, wherein said second sensor is an array of Time-of Flight device.

8. A system for capturing data of a scene, the system comprising:
  a. a first sensor, measuring temperature, providing a first data set provided in an array format;
  b. a second sensor, measuring distance, providing a second data set provided in an array format; and
  c. data manipulation means using at least said second data set to support enhanced data computations performed on the first data set to adapt the first data set by filtering or averaging first data set pixels to generate said scene data; wherein said adapting of part of said first data set is based on recalculating part of said data set by filtering first data set pixels; wherein said adapting of part, or whole, of said first data set is based on recalculating part of said data set by weighted averaging first data set pixels, whereby the weight factors are based on said second data set; wherein the data manipulation means is capable to distinguish a plurality of objects, based on said second data set; wherein said adapting of part of said first data set is based on recalculating part of said data set by assigning energy contributions in the first data set to objects, said assigning being based on said second data set.

9. The system of claim 8, wherein said recalculating takes into account past data.

10. The system of claim 8 wherein said recalculating takes into account temperature dynamic properties of objects.

11. The system of claim 8, wherein said first sensor is an absolute DC temperature device.

12. The system of claim 8, wherein said first sensor is based on an array of a IR thermopiles and/or said first sensor is based on an array of a bolometer.

13. The system of claim 8, wherein said second sensor is an active sensor.

14. The system of claim 8, wherein said second sensor is an array of Time-of Flight device.

* * * * *